United States Patent
Sekiguchi et al.

(10) Patent No.: US 6,772,419 B1
(45) Date of Patent: Aug. 3, 2004

(54) MULTI OS CONFIGURATION SYSTEM HAVING AN INTERRUPT PROCESS PROGRAM EXECUTES INDEPENDENTLY OF OPERATION OF THE MULTI OS

(75) Inventors: Tomoki Sekiguchi, Yokohama (JP); Toshiaki Arai, Machida (JP); Shigenori Kaneko, Hitachinaka (JP); Hiroshi Ohno, Hitachi (JP); Taro Inoue, Yamato (JP); Takashi Shibata, Fujisawa (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 09/151,270

(22) Filed: Sep. 11, 1998

(30) Foreign Application Priority Data

Sep. 12, 1997 (JP) .............................. 9-248178

(51) Int. Cl.[7] .............................................. G06F 9/00
(52) U.S. Cl. ...................................... 719/319; 718/107
(58) Field of Search ................................ 709/319, 103, 709/107, 329; 719/319, 329; 718/107, 103

(56) References Cited

U.S. PATENT DOCUMENTS 5,261,104 A * 11/1993 Bertram ...................... 395/700
5,414,851 A * 5/1995 Brice .......................... 395/650
5,721,922 A 2/1998 Dingwall
6,269,409 B1 * 7/2001 Solomon ..................... 709/329

OTHER PUBLICATIONS

Modern Operating Systems, Andrew S. Tanenbaum, Prentice Hall, 1992, pp. 21–22 and 637–641.

* cited by examiner

*Primary Examiner*—Meng-Al T. An
*Assistant Examiner*—The Thanh Ho
(74) *Attorney, Agent, or Firm*—Mattingly, Stanger & Malur, P.C.

(57) ABSTRACT

A computer system of a multi-operation-system (multi-OS) has a main memory having a memory area for a first OS and a memory area for a second OS, both the areas being independent from each other, and a plurality of I/O devices divisionally allocated to the first OS and the second OS. The first OS is loaded in the first OS memory area, and thereafter when the first OS is operated, the second OS is loaded in the second OS memory area and initialized. When the first OS is operated, the first OS hardware resources and the second OS hardware resources are registered by the first OS. Thereafter when the first OS is operated, the first OS inhibits the registration of an interrupt number already allocated to the second OS I/O device. In response to an interrupt request from a second OS I/O device, the second OS starts operating.

23 Claims, 16 Drawing Sheets

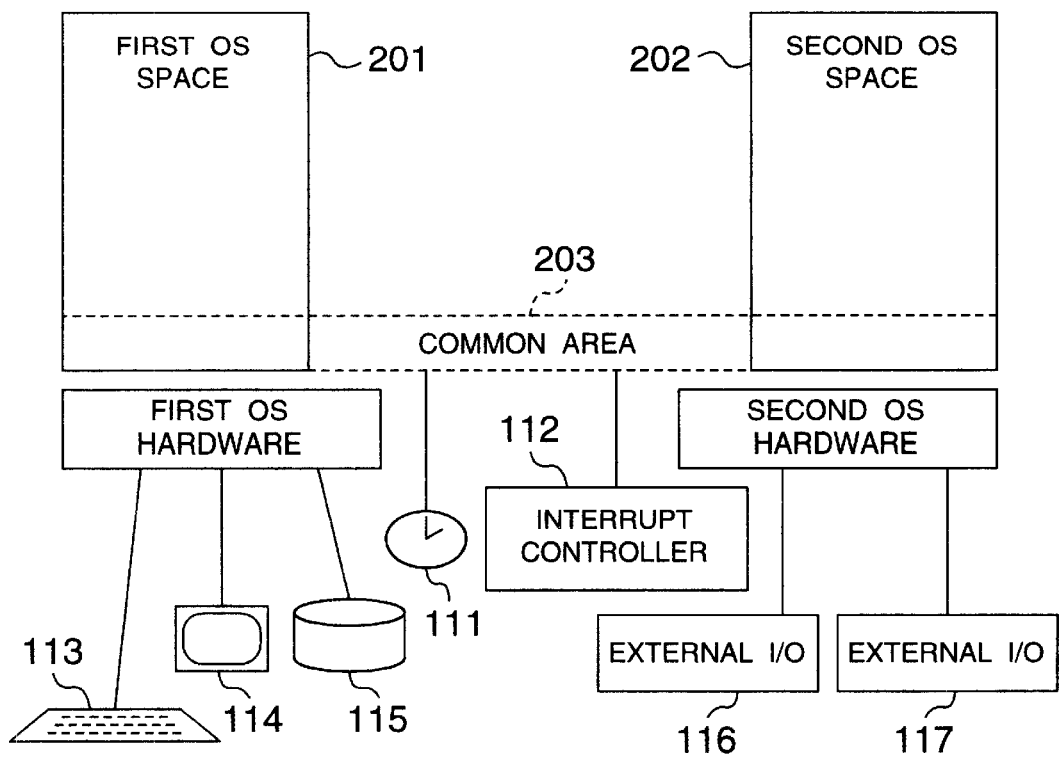

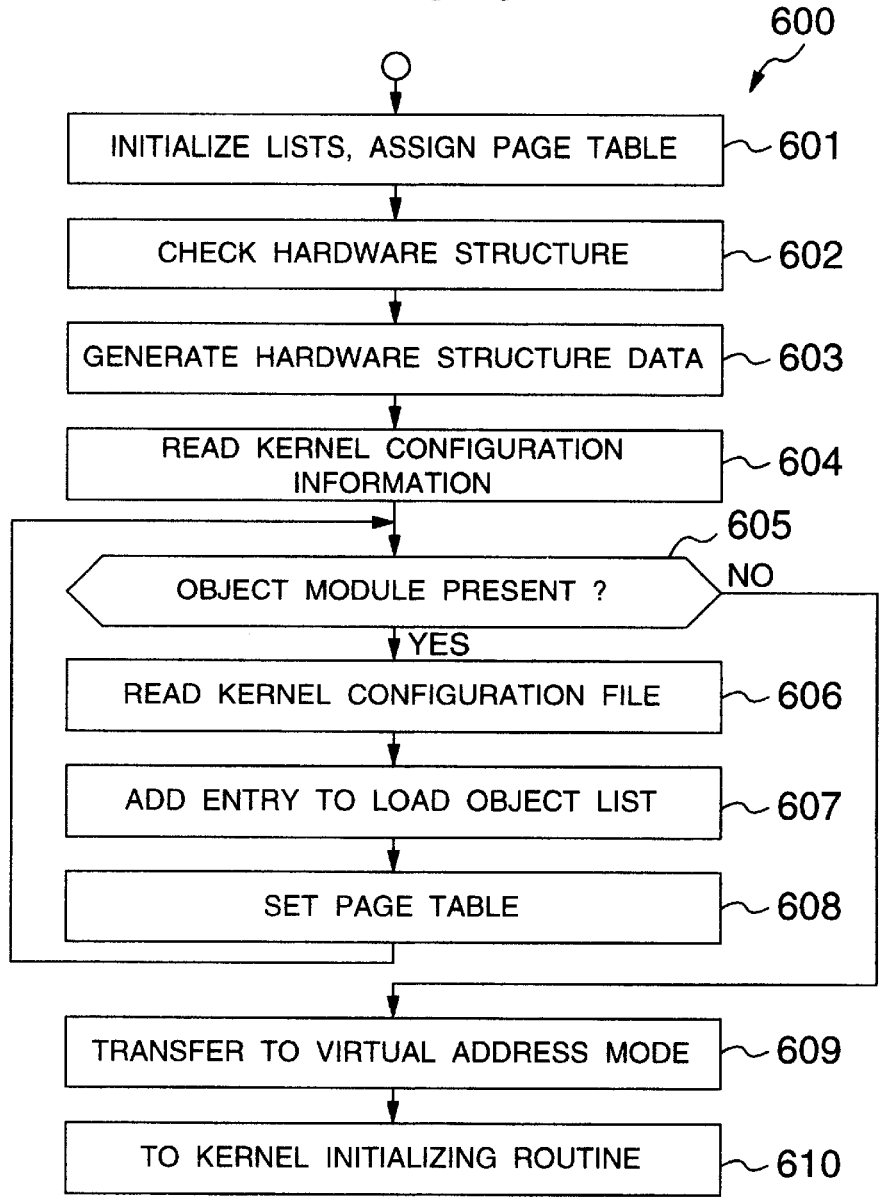

| INTERRUPT NUMBER | USAGE STATE |
|---|---|
| 0 | |
| 1 | |
| 2 | |
| 3 | |
| 4 | IN USE |
| 5 | IN USE |

| INTERRUPT LEVEL | INTERRUPT 0 | INTERRUPT 1 | INTERRUPT 2 | INTERRUPT 3 | INTERRUPT 4 | INTERRUPT 5 |
|---|---|---|---|---|---|---|
| 0 | | | | | | |
| 1 | | | | | | |
| 2 | | | | | | |
| 3 | | | | ✓ | | |
| 4 | | | ✓ | ✓ | | |
| 5 | | ✓ | ✓ | ✓ | | |
| 6 | ✓ | ✓ | ✓ | ✓ | | |

1800  1801 1802

1901 CHANGE FIRST OS STATE VARIABLE TO HALT
1902 HALT FIRST OS
1903 PERMIT INTERRUPT FROM DEVICE MANAGED BY SECOND OS
1904 WAIT FOR INTERRUPT

MULTI OS CONFIGURATION SYSTEM HAVING AN INTERRUPT PROCESS PROGRAM EXECUTES INDEPENDENTLY OF OPERATION OF THE MULTI OS

BACKGROUND OF THE INVENTION

The present invention relates to a control method for computers, and more particularly to a method of running a plurality of operating systems (OSs) on a single computer.

A general computer runs only a single OS which manages computer resources such as a processor, a memory, and a secondary storage and performs resource scheduling in order to realize an efficient operation of the computer.

There are various types of OSs, some excellent in batch processing, some excellent in time sharing system (TSS), and some excellent in graphical user interface (GUI).

There are needs of using a plurality of OSs on a single computer. For example, a mainframe is desired to operate both OS for executing practical online transaction processings and OS for research and development. There is also a requirement for running both OS having comparative GUI and OS excellent in real time.

However, each OS is assumed to manage computer resources by itself and a concurrent presence of a plurality of OSs is impossible unless some measure is incorporated.

As a measure for operating a plurality of OSs on a single computer, a virtual machine system realized by a mainframe is known (refer to "Modern Operating Systems": Andrew S. Tanenbaum, Prentice Hall, 1992 (pp. 21 to 22). In a virtual machine system, a virtual machine control program dominantly manages all hardware resources, and virtualizes these resources to configure the virtual machine system. A controller of a virtual machine system virtualizes physical memories, input/output (I/O) devices, external interrupts and the like.

For example, each divided physical memory is handled by each virtual machine as if it is a memory starting from the address "0". Device numbers identifying I/O devices are similarly virtualized. In addition, a magnetic disk is also virtualized by dividing its memory area.

Each OS is scheduled by the control program so that OS runs on a virtual machine configured by the control program. However, in a virtual machine system of a mainframe, since computer resources are completely virtualized and divided, the controller of a virtual machine becomes complicated.

Setting a control register from an OS running on a virtual machine and a privilege instruction such as an I/O instruction issued by the OS, are required to be emulated by a virtual machine control program if there is no specific hardware support. A problem of a large overhead therefore occurs. In practice, this overhead is reduced in a mainframe which configures virtual machines, by adding hardware realizing processor functions and micro codes specific to the virtual machines. The virtual machine system aims at completely virtualizing computer resources, so that the system becomes complicated. Furthermore, to realize a high performance of a virtual machine, specific hardware is required.

A microkernel is know as techniques for providing a single computer with interface with a plurality of OSs (refer to "Modern Operating Systems": Andrew S. Tanenbaum, Prentice Hall, 1992 (pp. 637 to 641). If a microkernel is used, an operating system server is configured on the microkernel, the server providing an OS function transparent to a user which utilizes computer resources via the server. If each OS is provided with such a server, a user is provided with various OS environments.

With the microkernel system, however, it is necessary to newly configure an operating system server compatible with a microkernel. In many cases, currently existing OSs are modified so as to run on the microkernel. The core portion of each OS such as scheduling and memory management is required to be modified. There are many portions to be modified. In addition, these modified portions are related also to the main part of each OS, so that the modification work is complicated and difficult.

Still further, although the operating system server utilizes services of the microkernel, this operation is not used by a general OS so that an overhead increases and the system performance is degraded.

In U.S. Pat. No. 5,721,922, a new scheduler is embedded in an OS interrupt handler to introduce a scheduling scheme without relying upon the original OS scheduler. However, in this case, an execution environment of the embedded scheduler is that of the original OS, and a task to be executed is defined by the original OS. This patent does not teach a method of sharing a plurality of OSs through division of resources such as I/O devices and through spatial division.

A conventional virtual machine system has relied upon a scheme of virtualizing all computer resources in order to run a plurality of OSs at the same time. This scheme is, however, associated with a problem of complicated control programs. In addition, this scheme requires emulation of privilege instructions so that specific hardware is necessary in order to retain the system performance.

SUMMARY OF THE INVENTION

It is an object of the present invention to provide a method and system capable of configuring a plurality of OSs with a relatively simple structure.

This invention realizes concurrent execution of a plurality of OSs without using specific hardware, by modifying an initializing process and interrupt management of each OS and by adding an interrupt management program. Since the invention does not require emulation of a privilege instruction, execution of each OS is not associated with a new overhead.

According to the invention, it is possible to readily add a function of supplementing a first OS under a second OS. Further, a function quite independent from the first OS can be embedded under the second OS, which is not possible by a device driver of the first OS. It is therefore possible to add a highly reliable function independent from the first OS. The invention is suitable for using a currently existing OS as the first OS.

According to the invention, modification of the first OS is limited only to an initializing process and interrupt management so that a multi-OS environment can be configured with ease.

According to the invention, the first OS reserves computer resources such as physical memories and external devices managed by the second OS, and a management program independent from both the first and second OSs captures an external interrupt issued from a computer resource. The management program determines from an interrupt factor which interrupt handler of one of the first and second OSs is activated, and also determines a timing of activating the interrupt handler in accordance with the execution state of the OS associated with the interrupt. The interrupt handler of each OS is activated in the above manner to run the two OSs on a single computer.

BRIEF DESCRIPTION OF THE DRAWINGS

FIG. 2 is a diagram illustrating a conceptual configuration of the computer of the embodiment.

FIGS. 3A and 3B are diagrams showing the structures of page tables of the embodiment.

FIG. 6 is a flow chart illustrating a boot process to be executed by the computer of the embodiment.

FIG. 7 is a diagram showing the structure of a kernel configuration information file of a first OS of the embodiment.

DESCRIPTION OF THE PREFERRED EMBODIMENTS

Embodiments of the invention will be described with reference to the accompanying drawings.

Figure 1:
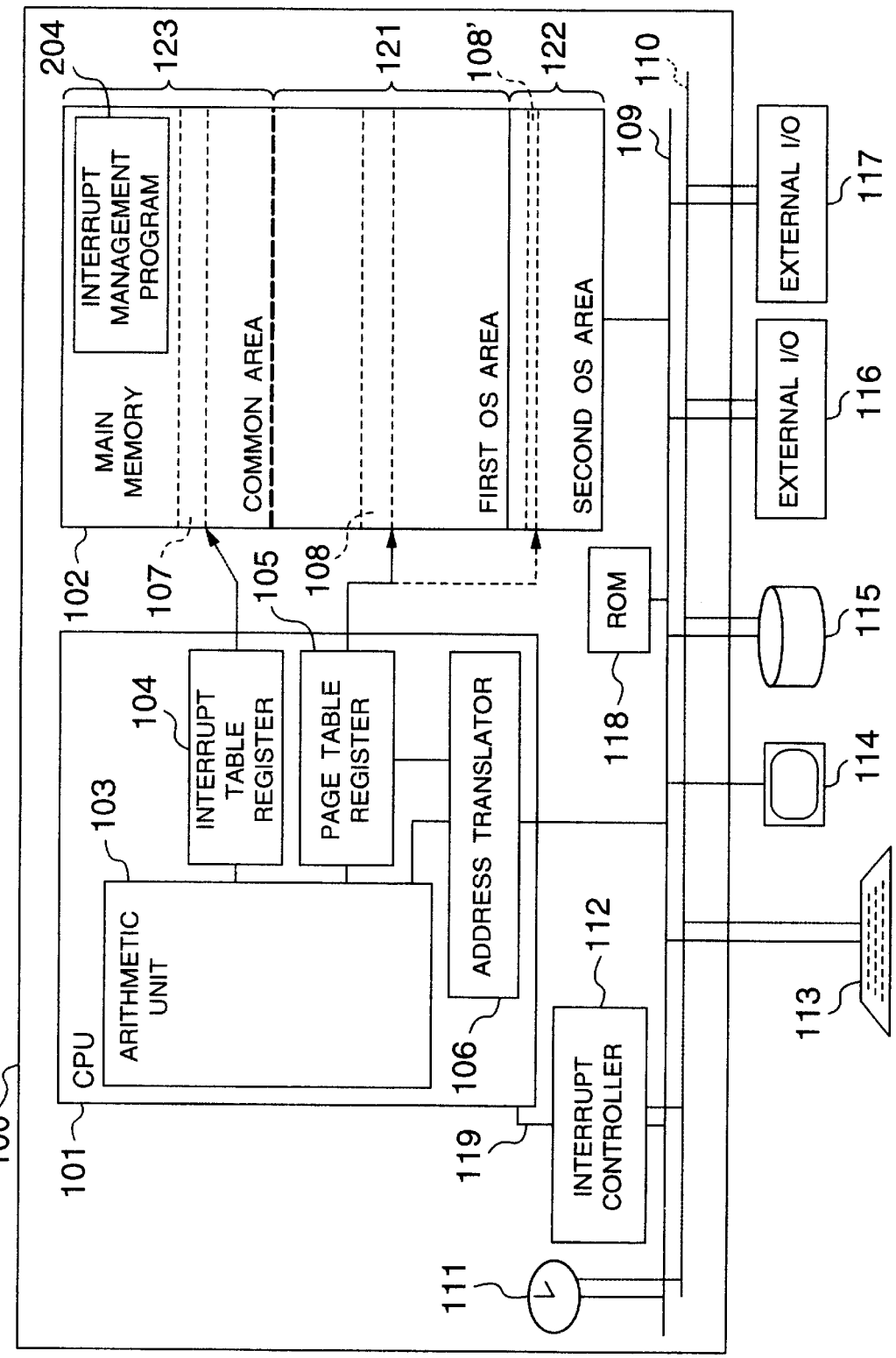
FIG. 1 is a diagram showing the configuration of a computer according to an embodiment of the invention.

FIG. 1 is a diagram showing the configuration of a computer 100 according to an embodiment of the invention. In FIG. 1, the computer 100 is constituted of a processor 101, a main memory 102, a bus 109, an interrupt signal line 110, a clock interrupt generator 111, an interrupt controller 112, a read only memory (ROM) 118 storing a program for a booting procedure, and an interrupt bus 119.

The interrupt signal line 110 connects the interrupt controller 112 to external I/O devices 113 to 117.

When one I/O device generates an interrupt signal, the interrupt controller 112 receives this interrupt signal via the interrupt signal line 110. The interrupt controller 112 changes this interrupt signal to a numerical value and passes it via the interrupt bus 119 to the processor 101.

The clock interrupt generator 111 periodically generates an interrupt signal.

The interrupt controller 112 receives an interrupt request from the external I/O device, generates an interrupt signal represented by a numerical value specific to the interrupt requester, and passes it to the processor 101. It is assumed that the interrupt signal from a particular I/O device can be made not to be notified to the processor 101 in accordance with an instruction from the processor 101.

The processor 101 is constituted of an arithmetic unit 103, an interrupt table register 104, a page table register 105, and an address translator 106.

The interrupt table 104 indicates a virtual address of the interrupt table 107 referred to by the processor 101. Although the details of the interrupt table 107 will be later given, this table stores a start address of an interrupt handler for each interrupt number. The interrupt table 107 is stored in a common area 123 of the main memory 102. The reason why the connection between the interrupt table register 104 and the interrupt table 107 is indicated by a broken line in FIG. 1 is that the interrupt table register 104 indicates the virtual address of the interrupt table 107. When an interrupt occurs, the processor 101 receives the interrupt number from the interrupt controller 112. By using this number as a search index, the processor acquires an interrupt handler address from the interrupt table 107 to pass the control to the interrupt handler.

The page table register 105 indicates the page table 108. The page table register 105 stores a physical address of the page table 108. The page table 108 is used by a first OS. A page table 108' for a second OS is also stored in a second OS area 122.

The address translator 106 receives an instruction address or an operand address from the arithmetic unit 103, and performs a virtual-real address translation in accordance with the contents of the page table 108 indicated by the page table register 105.

In the embodiment shown in FIG. 1, the external I/O devices connected to the computer 100 include a keyboard 113, a display 114, a magnetic disk 115, and other external devices 116 and 117. The devices excepting the display 114 are connected via the interrupt signal line 110 to the interrupt controller 112.

The contents of the main memory 102 will be described. In this embodiment, two OSs run on the computer 101 which are called a first OS and a second OS. It is assumed that as the computer 100 starts, the first OS runs thereon and the external I/O devices 116 and 117 are managed by the second OS.

The first OS reserves a physical memory area 122 for the other OS or second OS at an earlier setup stage. Namely, the first OS reserves the physical memory area 122 so that the first OS cannot use this physical memory area reserved for the second OS. FIG. 1 illustrates a state that the second OS is loaded in the area 122 assigned by the first OS.

During the initializing stage of the first OS, the external I/O devices to be used by the first OS are registered and also the external I/O devices 116 and 117 to be used by the second OS are registered. Therefore, even if the first OS intends to use the interrupt numbers registered for the external I/O devices 116 and 117 after the initialization of the first OS, the first OS cannot reserve them because it appears from the first OS that the interrupt numbers and I/O addresses for the external I/O devices 116 and 117 are already used.

As described earlier, the first OS has the common area 123 shared by all OSs. The common area 123 stores therein the interrupt table 107, an interrupt management program 204, an interrupt discrimination table 1520, an interface module accessible from each OS, and the like.

In the embodiment shown in FIG. 1, the second OS runs with a priority over the first OS. This means that the first OS can run only while the second OS is in an idle state. The first OS cannot run unless the process by the second OS is completed.

When the external I/O device managed by the second OS issues an interrupt, the process by the first OS is intercepted, and the control is passed to the second OS. Even if an interrupt is issued from the external I/O device managed by the first OS during the execution of the second OS, this interrupt process is postponed until the process by the second OS is completed.

The memory areas 121 and 122 for the first and second OSs are definitely discriminated in the main memory 102 and are not accessible from the other OS, excepting the common area 123 where the interrupt handlers and the like are stored. It is therefore possible not to erroneously access the other OS storage area and prevent any system failure. The external I/O devices 113 to 115 managed by the first OS and the external I/O devices 116 and 117 managed by the second OS are also definitely discriminated.

FIG. 2 is a diagram illustrating a concept of the relation between two OSs of the embodiment. Each OS occupies an independent address space. Reference numeral 201 represents a virtual space for the first OS, and reference numeral 202 represents a virtual space for the second OS. A real storage area for the second OS space 202 is in the second OS area of the main memory 102 shown in FIG. 1.

A common area 203 is mapped to partial areas of the virtual spaces. A real storage area for the common area 203 is the common area 123 of the main memory 102 shown in FIG. 1. The common area 203 is originally a partial area of the kernel area of the first OS. In the process of loading the second OS, the second OS page table is formed so as to map the common area 203 to the address space 202 when the address space 202 is formed. This procedure will be later described.

FIG. 2 also shows the hardware managed by each OS. The first OS manages the keyboard 113, display 114 and magnetic disk 115, whereas the second OS manages the I/O devices 116 and 117. Although a clock 111 and the interrupt controller 112 are originally managed by the first OS, they are managed by a program in the common area 203, as shown in FIG. 2.

FIGS. 3A and 3B respectively show the structures of page tables 108 and 108' of the embodiment.

The page table 108 has virtual page descriptive entries for each virtual page of the virtual address space 201 of the processor 101. The entries include a valid bit 301 and a physical page number 302.

The valid bit 301 indicates whether a physical page corresponding to the virtual page is being allocated, i.e., whether the virtual-real address translation is possible. For example, the virtual page No. 3 in the page table 108 is not set with a valid bit. It means that the physical page corresponding to the virtual page No. 3 is not present in the main memory 102. When an access to a virtual page not set with the valid bit 301 is generated, the processor generates a page fault.

The physical page number 302 stores the physical page number corresponding to the virtual page.

The address translator 106 translates a virtual address supplied from the arithmetic unit 103 into a real address, by referring to the contents of the page table 108 or 108' indicated by the page table register 105. The processor 101 accesses the main memory 102 by using the translated real address.

By switching the page table 108 to the page table 108', the independent space 202 can be configured. The first OS space 201 and second OS space 202 shown in FIG. 2 can be configured. The common area 203 can be formed by mapping the same physical pages contained in the physical memory area 123 to the entries of the page tables corresponding to the common area 203 of both the OSs.

The page table 108' shown in FIG. 3B is used for the second OS. In this example, the physical page corresponding to the virtual page No. 1 of the page table 108' is assigned the same physical page No. 56 as the page table 108. This means that these entries form the common area 203. The other virtual pages are assigned the physical pages different from those made valid by the first OS. This means that the first and second OSs independently form the respective spaces 201 and 202.

Figure 4:
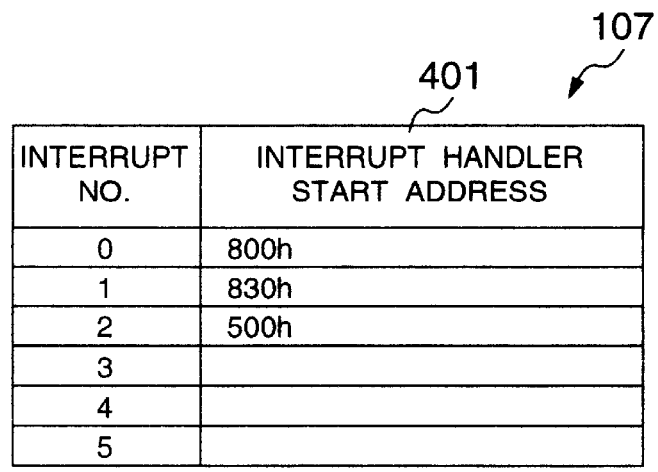
FIG. 4 is a diagram showing the structure of an interrupt table of the embodiment.

FIG. 4 shows the structure of the interrupt table 107.

The interrupt table 107 stores therein a virtual address 401 of an interrupt handler for each interrupt number which the processor 101 receives from the interrupt controller 112. Upon reception of the interrupt request from the interrupt controller 112, the processor 101 acquires an address of the interrupt handler corresponding to the interrupt number from the interrupt table 107 designated by the interrupt table register 104, passes the control to this address, and starts a process of the interrupt management program 204 using the interrupt identification table 1520 shown in FIG. 15. Another interrupt table used when the first OS only runs is also present in the first OS area 121, and the address of the interrupt handler indicated by this table does actual interrupt process. Therefore, the detailed description thereof is omitted.

Figure 5:
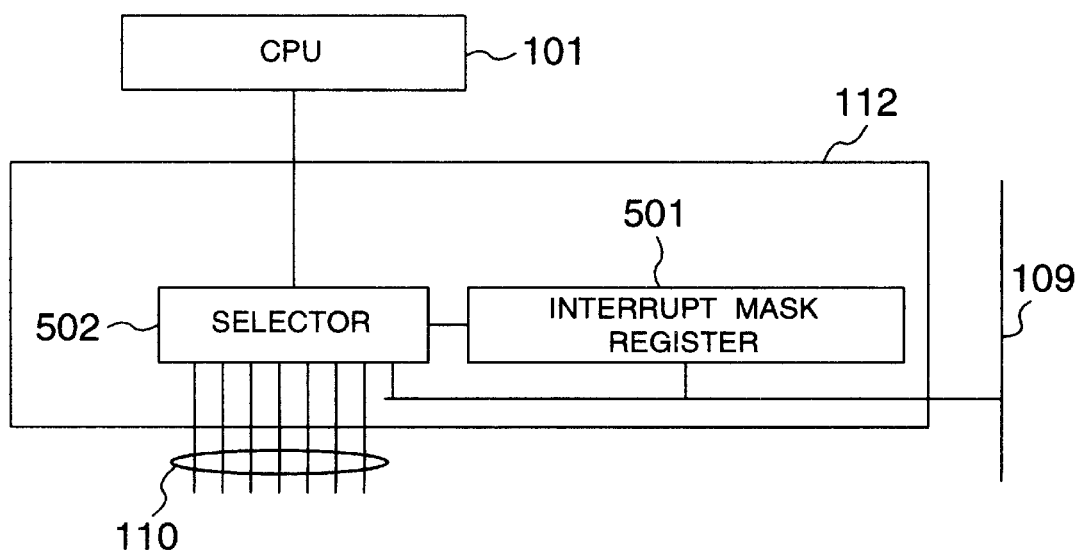
FIG. 5 is a diagram showing the structure of an interrupt controller of the embodiment.

FIG. 5 shows the interrupt controller 112. The interrupt controller 112 has an interrupt mask register 501 and a selector 502.

An I/O device which issues an interrupt is connected via the interrupt signal line 110 to the interrupt controller 112. A priority order of interrupt is determined based on which interrupt signal line 110 is used for the interrupt signal. It is herein assumed that the interrupt signal corresponding to the interrupt No. 1 has a highest priority.

The interrupt signal 110 is connected to the selector 502. Upon reception of the interrupt signal, the selector 502 holds the information that there is an interrupt still not processed, until the processor notifies a reception of the subject interrupt.

The interrupt mask register 501 holds the information that an information issued from the I/O device is allowed to be notified to the processor 101. The contents of the interrupt mask register 501 can be set by an I/O instruction from the processor 101.

When an interrupt request is received from the interrupt signal line 110 and when the contents of the interrupt mask resister 501 are renewed, the selector 502 compares the interrupt still not processed and held therein with the contents of the interrupt mask register 502, to thereby determine whether the interrupt is notified to the processor 101. Specifically, among those interrupts still not processed and held in the selector 502, interrupts which are allowed to be notified to the processor 101 by the interrupt mask register 501 are sequentially notified to the processor 101, in the order starting from the highest priority order. In this case, the selector 502 sends the numerical signal corresponding to the interrupt signal to the processor 101 via the interrupt bus 119.

Upon reception of the interrupt, the processor 101 can delete the unprocessed interrupt record in the selector 502, by using an I/O instruction.

Next, the booting process of the computer of this embodiment will be described.

The initial part of the booting process is written in ROM 118. ROM 118 is connected via the bus 109 to the processor 101 and mapped at a predetermined address of the physical space of the processor 101. In the booting process, a hardware configuration is detected and a program for loading the OS kernel is loaded in the main memory 102.

When the processor 101 is reset, the processor 101 passes the control to a predetermined physical address. ROM 118 stores the program to be executed at this time. ROM 118 is mapped to the physical address space so that when the processor 101 is reset, the control is passed to this program.

The program stored in ROM 118 loads a first OS kernel loader stored in the magnetic disk 112 into the main memory 102, and executes it. The kernel loader is stored in the main memory 102 at a predetermined location, so that the program stored in ROM 118 can easily locate this loader.

The process to be executed by the kernel loader will be described. FIG. 6 is a flow chart illustrating the process to be executed by the kernel loader 600 of the first OS of the embodiment.

The kernel loader 600 is configured so that it can understand the file system of the first OS, identifies the location of a file from a file name, and loads the file in the main memory.

In the process of the kernel loader shown in FIG. 6, first a main memory list 1101 (FIG. 11), a load module list 1104 (FIG. 11), and a device list 1102 (FIG. 11) which are parameters to be passed to the kernel, are initialized, and thereafter a page table area for the kernel is assigned (Step 601). The structures of the above three lists will be later described.

The main memory list 1101 has a data structure indicating a usage state of the main memory 102. When the kernel loader allocates the physical memory at a later stage, it refers to the main memory list 1101 and updates the list 1101.

Next, a hardware configuration is checked (Step 602) and hardware configuration data is generated (Step 603). In Step 602 it is checked what I/O device is connected to the computer 100. At Step 603 a device list 1102 regarding the hardware configuration data is generated in accordance with the check results at Step 602. An OS kernel refers to this device list 1102 and executes a kernel initializing process.

Next, the configuration information 700 of the OS kernel is read from the magnetic disk 112, and an address at which the configuration information 700 is stored is set to a parameter table 1100 (Step 604). The OS kernel may be constituted of a plurality of files, such as files of the kernel itself and files of other device drivers. The configuration information 700 is being stored in the magnetic disk 112 under a predetermined file name. By using this file name, the load program can locate this information.

An example of the data structure of the kernel configuration information of the embodiment is shown in FIG. 7. Reference numeral 700 represents the contents of files which store the kernel configuration information. The configuration information file 700 stores therein the data which the kernel loader and first OS refer to. The stored data is given a name, and the program can acquire the data by using this name. In the example shown in FIG. 7, there is an entry having a name of an object file 701, and the data of this file is stored in an entry 702. An entry having a name of secondary OS stores data specific to the second OS in an entry 704.

Reverting to FIG. 6, after the configuration information 700 is read, all the files of the kernel configuration information 700 stored in the entry corresponding to the object file name are read (Step 606). In this case, the object files for the first OS having the names of kernel 1, driver 1, and driver 2 are loaded. An entry is added to a load object list 1104 (FIG. 11) (Step 607), and the page table for the kernel is set (Step 608).

Addition of an entry to the load object list and setting the page table for the kernel are executed in accordance with the data stored in the object file loaded in the main memory 102. The object file constituting the kernel contains a virtual address at which the file contents are mapped, a size of the file, and the like. The page table is configured by referring to the object file. The data structure of the object file will be later described.

Lastly, the page table register (pointer) 105 is set with an address of the configured page table 107 and the processor transfers to a virtual address translation mode (Step 609). The control is then passed to a kernel initializing routine which uses the parameter table 1100 containing a set of the configured main memory list 1101, device list 1102, kernel configuration information table 1103, and load object list 1104 to obtain parameters (Step 610). An entry point of the kernel is stored in the kernel file.

Figure 8A:
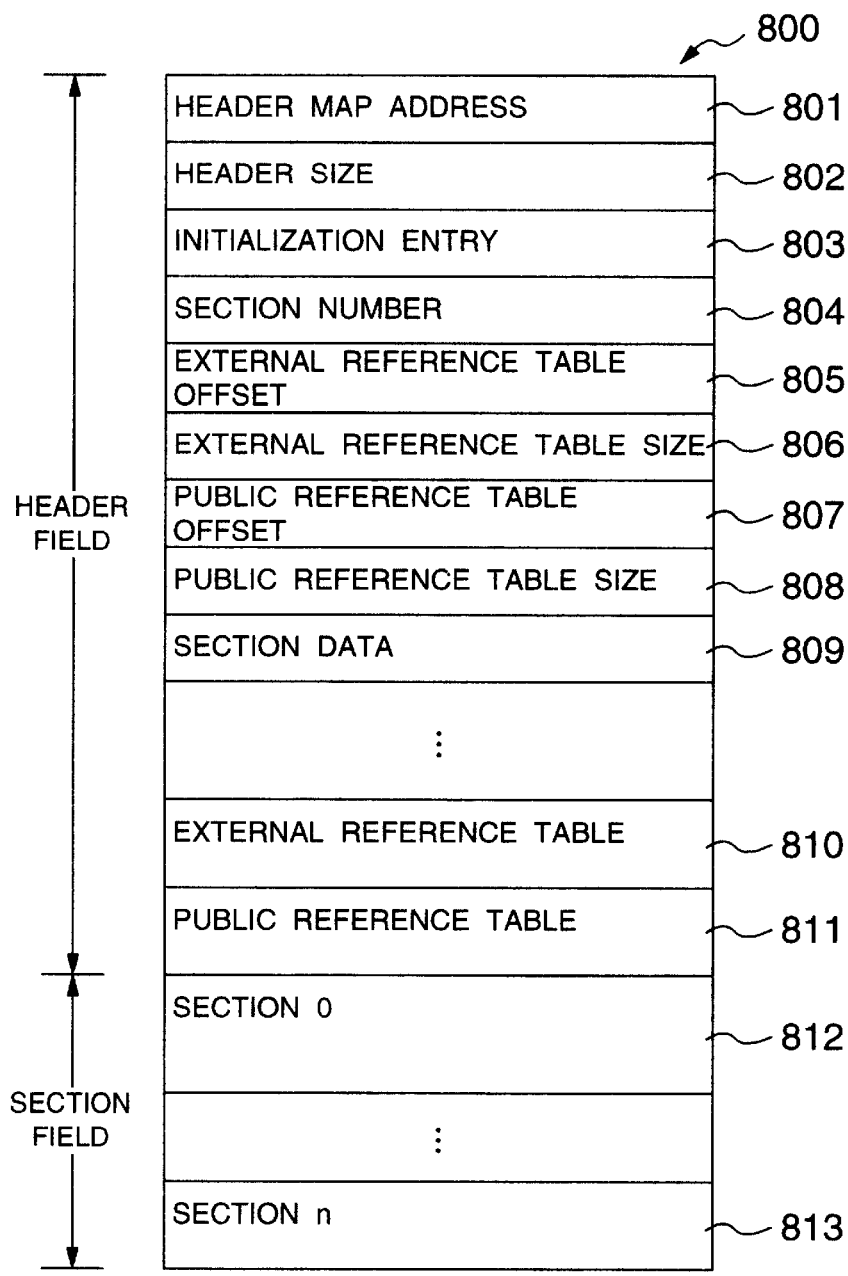
FIGS. 8A and 8B are diagrams showing the structure of an object file of the embodiment.
Figure 8B:
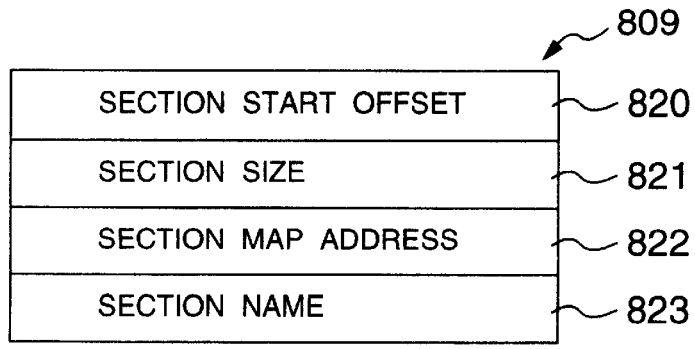

FIGS. 8A and 8B are diagrams showing the structure of the object file constituting the kernel of the embodiment.

In FIG. 8A, reference numeral 800 represents the whole of the object file. The object file 800 is constituted of a header field 801 to 811 and a section field 812 to 813.

In the structure of the header field, a header map address 801 and a header size 802 describe a memory area of the header field of the object file 800 in the kernel space. The header field is read at the address stored in the entry of the header map address 801.

An initialization entry 803 stores an address of an initializing routine for the kernel initialization. When the kernel is initialized, the kernel calls the initializing routine for each object file by referring to the initializing entry 803 of each object file.

A section number 804 stores the number of sections contained in the object file 800. A section is a continuous data area in the object file. By using this section as a unit, the object file is mapped to the virtual space. For example, the object file contains a section which stores execution codes and a section which stores data the object file refers to. These sections are formed by a compiler when the object file is formed.

An external reference table offset 805 and an external reference table size 806 describe an external reference table 810 which stores external reference information of other object files and is referred to by execution codes of this object file. The external reference table 810 is contained in the header field of the object file 800, and the external reference table offset 805 indicates an offset of the external reference table 810 from the start of the header field.

A public reference table offset 807 and a public reference table size 808 describe a public reference table 811 which stores the information of module and data made public by this object file to execution codes of other object files. The public reference table 811 is contained in the header field of the object file 800, and the public reference table offset 807 indicates an offset of the public reference table 811 from the start of the header field.

A section data 809 stores data of each section contained in the object file 800. The number of section data sets is as many as the section number 804. The structure of section data will be later described.

After the section data, the external reference table 810 and public reference table 811 are stored to constitute the header field.

After the header field, each section 812, ..., 813 is stored.

The structure of the section data shown in FIG. 8A will be described. A section start offset 820 and a section size 821 shown in FIG. 8B indicate the start offset and size of the subject section in the object file 800.

Each section is mapped to the virtual space of the kernel at the address stored in an entry of the section map address 822. A section name 823 stores a character string representative of the name of the subject section.

Figure 9:
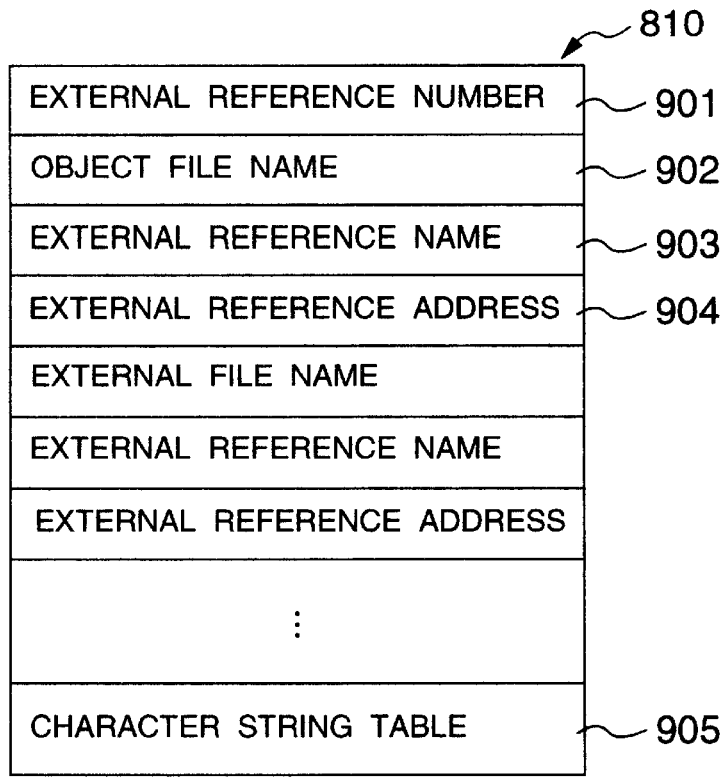
FIG. 9 is a diagram showing the structure of the object file of the embodiment.

The structure of the external reference table will be described. FIG. 9 shows the structure of the external reference table. At the start of this table 810, the number 901 of external reference information pieces contained in the table is stored.

Next, an object file name 902 and an external reference name 903 are stored. The object file name 902 and external reference name 903 stores an offset value to a character string table 905, whereas the actual name by a character string is stored in a character string table 905.

An external reference address 904 stores an actual address of an external reference described in the external reference entry. When the kernel loads the object file 800 in the main memory 102, it acquires the address of a function or data by referring to the public reference table including the external reference table of the object file, and sets it to the external reference address 904. Execution codes of the object file are compiled so that they can perform function call or data reference to another object file by referring to the address stored in the external reference address 904.

The object file name 902, external reference name 903, and external reference address 904 define one external reference. These three entries are continuously arranged in the external reference table as many as the external reference number 901. After these entries, the character string table 905 is stored. The character string table 905 stores character strings of object file names and external reference names.

Figure 10:
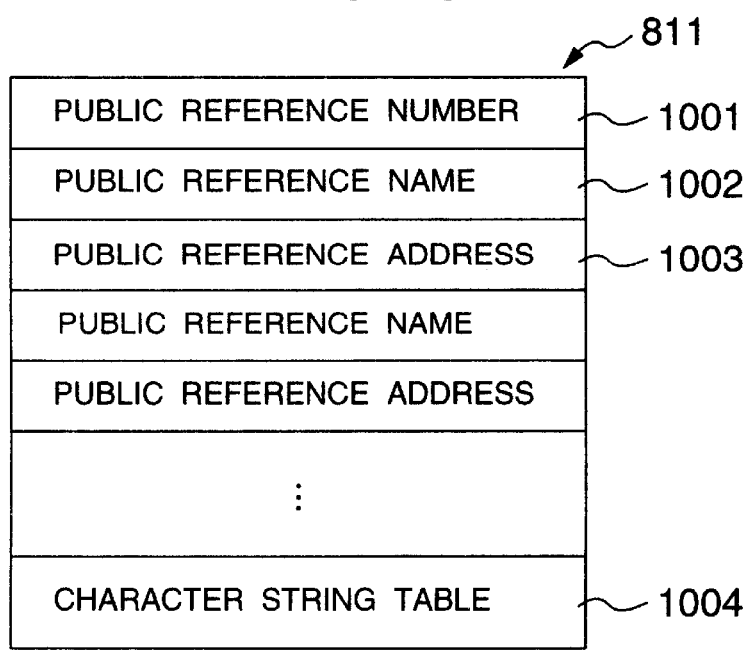
FIG. 10 is a diagram showing the structure of the object file of the embodiment.

The structure of the public reference table will be described. FIG. 10 shows the structure of the public reference table 811.

At the start of this public reference table 811, the number 1001 of references made public by this table 811 to other object modules is stored. One public reference is described by a public reference name 1002 and a public reference address 1003. The public reference name 1002 stores an offset value to a character string table 1004, whereas an actual name by a character string is stored in the character string table 1004. The public reference address 1003 stores the address of this reference.

Figure 11:
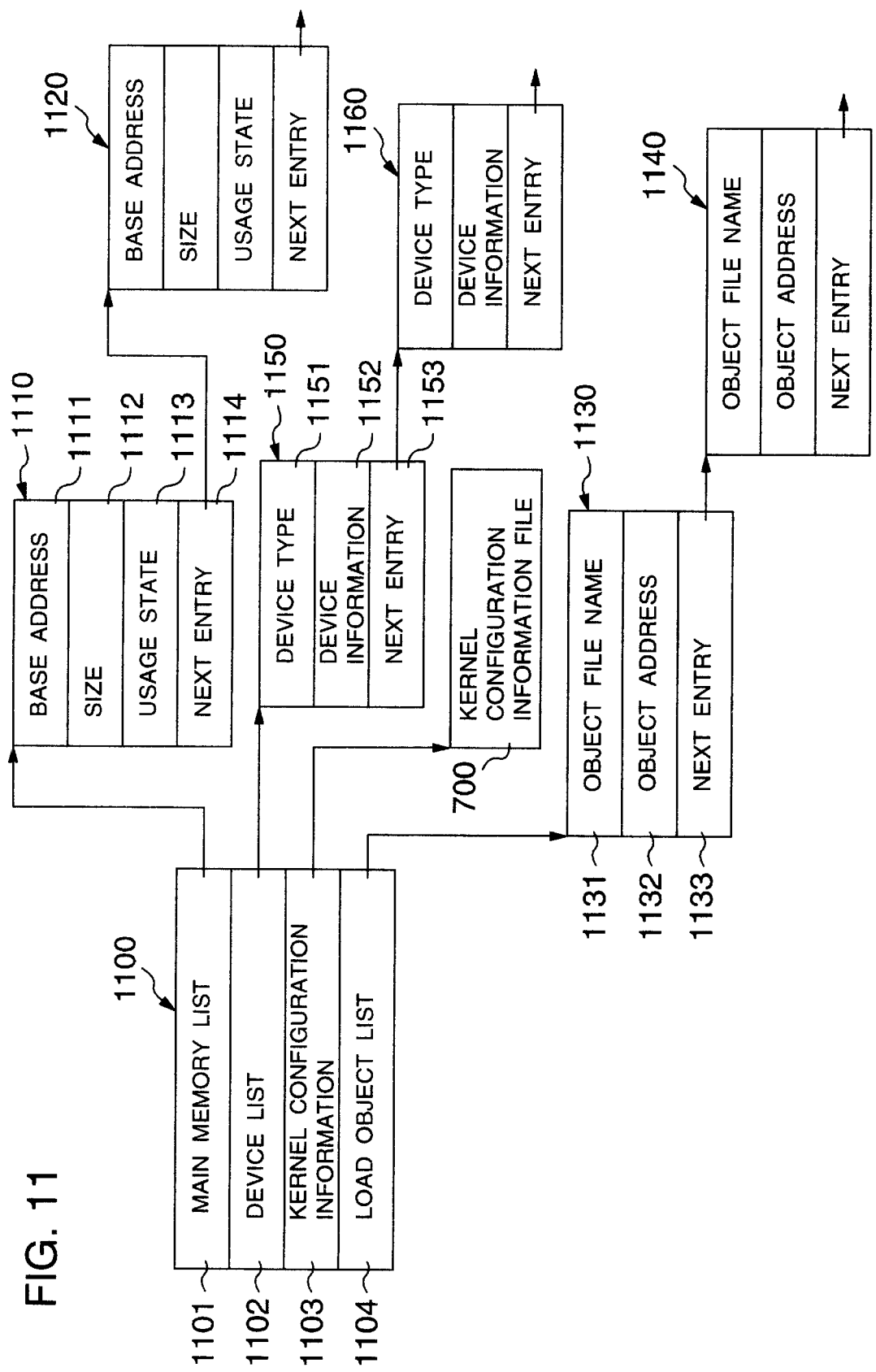
FIG. 11 is a diagram showing the data structure of a kernel setup parameter table of the embodiment.

Next, the hardware configuration data and load object data generated by the booting process starting at Step 601 shown in FIG. 6 will be described. FIG. 11 is a diagram showing the structure of the hardware configuration data and load object data.

Referring to FIG. 11, the parameter data 1100 has the data structure generated by the kernel loader. Three lists starting from the parameter list 1100 can be accessed by the kernel because they are located in the virtual space of the kernel which the loader configures.

The parameter table 1100 has pointers to the starts of three lists configured by the loader and a pointer to one table. The three lists are the main memory list 1101, device list 1102, and load object list 1104. One table is a kernel configuration information table 1103. Each of these will be described next.

The main memory list 1101 is a list of main memory block descriptive data 1110. The main memory block descriptive data 1110 includes a base address 1111, a block size 1112, a block usage state 1113, and a pointer 1114 to the next main memory block descriptive data.

The main memory block descriptive data stores a usage state of a continuous main memory area. The base address 1111 indicates a physical start address of the continuous memory area, and the block size 1112 stores the size of the continuous area. The block usage state 1113 stores a value representative of whether the continuous area is not used or already allocated by the loader. These three sets of data and the next entry pointer 1114 constitute the list. In the example shown in FIG. 11, the next entry is a list 1120. By referring to the main memory list 1101, the usage state of the physical memory can be known.

The device list 1102 stores data regarding the hardware devices and generated by the kernel loader at Step 603. The device list 1103 is a list of device data. The device data 1150 includes a device type 1151, device information 1152, and a pointer 1153 to the next device list.

The device type 1151 stores a value representative of the type of a device described in the device data entry 1150. The device information 1152 stores data specific to the device type. For example, the interrupt number, I/O address or the like is stored. The next entry pointer 1153 and the above data constitute the device list.

A pointer 1103 to the kernel configuration information table points the contents of the kernel configuration information file 700 read by the kernel loader into the main memory 102.

The load object list 1104 stores data regarding the object file loaded by the kernel loader into the main memory, and is a list of load object data 1130. The load object data 1130 includes an object file name 1131, an object address 1132, and a pointer 1133 to the next load object list.

The object file name 1131 stores a file name of the object file described in the load object data 1130. The object address 1132 stores an address of the kernel space where the header field of the subject object file is loaded. The next entry pointer 1133 and the above data constitute the load object list.

The load object list 1104 is generated at the same time when the kernel loader reads the object file constituting the kernel (Step 607).

Figure 12:
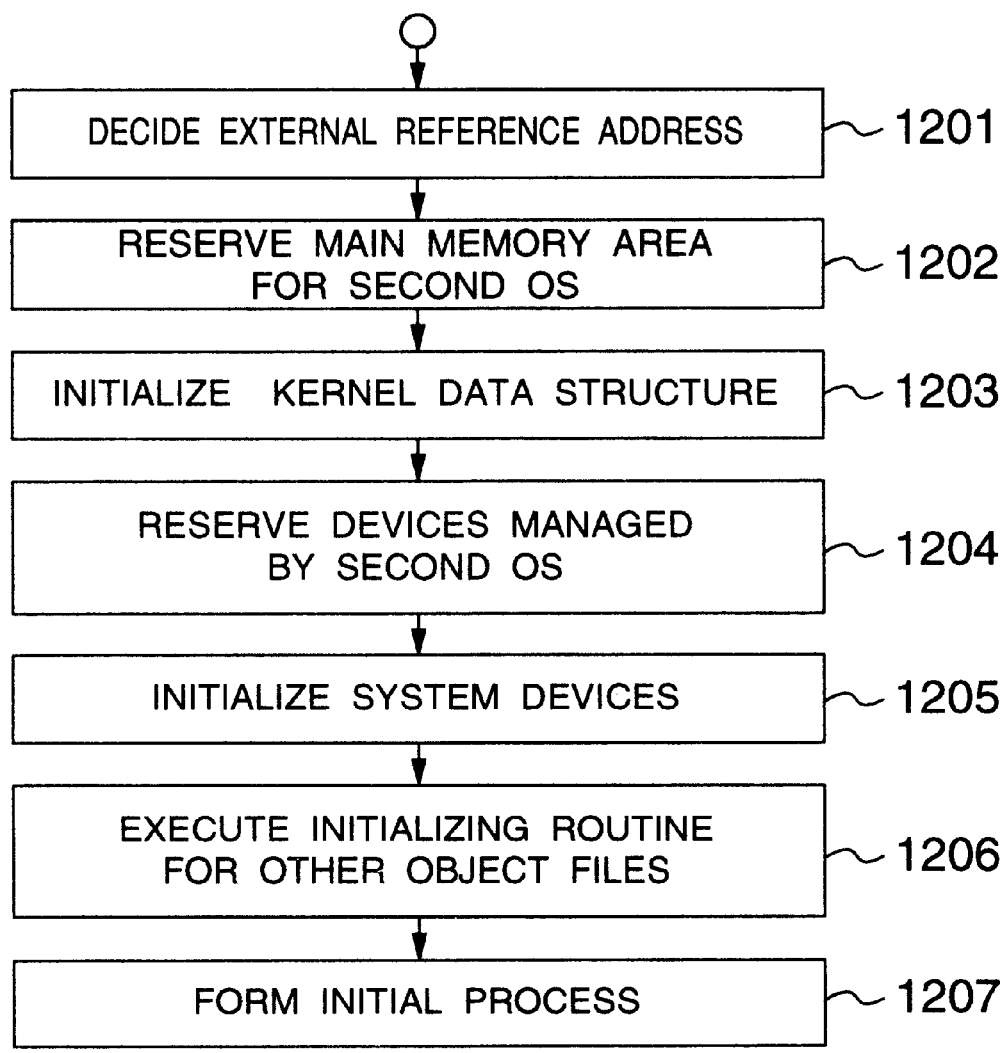
FIG. 12 is a flow chart illustrating an initializing process of a first OS of the embodiment.

Next, an initializing process of the first OS of this embodiment will be described. FIG. 12 is a flow chart illustrating the initializing process of the first OS.

First, the external reference address of the object file loaded by the kernel loader is determined, by referring to the load object list 1104 in the parameter table 1100 passed as the parameters (Step 1201). Each external addresses 904 of the external reference table 810 of each object file is decided. This address is decided by referring to the public reference table 811 of the object file.

Next, at Step 1202 a main memory area for the second OS is reserved by referring to the main memory list 1101 of the parameter table 1100 passed as the parameters when the kernel is set up. For example, of 64 MB of the main memory 102, 4 MB is allocated to the second OS as its main memory area.

More specifically, information on the second OS is fetched from the kernel configuration information table 700. In the example shown in FIG. 7, the configuration information of the second OS is stored in the entry 704. By referring to this configuration information 704, the size of the main memory to be reserved for the second OS is determined (e.g., 4 MB). The contents of the free block entry of the main memory list 1101 are changed (e.g., reduced from 64 MB to 60 MB), and this main memory area is allocated. This process is executed before the first OS starts managing the free memory.

Therefore, the main memory area allocated to the second OS is not present when observed by the first OS, and the first OS cannot therefore access it. The main memory area allocated to the second OS can be freely used by the second OS, and corresponds to the second OS area 122 shown in FIG. 1.

In place of Step 1202, the kernel loader may configure the main memory list so as to limit the physical memory amount passed to the first OS (e.g., only 60 MB in 64 MB is present as the main memory). Also in this case, the second OS can freely use 4 MB higher than 60 MB.

At Step 1203, the inner data structure of the kernel is initialized. This initialization contains initializing the device management table to be later described.

At Step 1204 devices to be managed by the second OS are reserved. This intends to make the first OS unable to use an interrupt and I/O address of the device managed by the second OS. Specifically, the device (e.g., 116, 117) managed by the second OS is registered in the device management table managed by the first OS.

The device resources managed by the second OS are determined by referring to the second OS configuration information stored in the table 700 designated by the kernel configuration information 1103 of the parameter table 1100. In this embodiment, the second OS configuration information corresponds to the data stored in the entry 704 shown in FIG. 7.

Figures 13A, 13B:
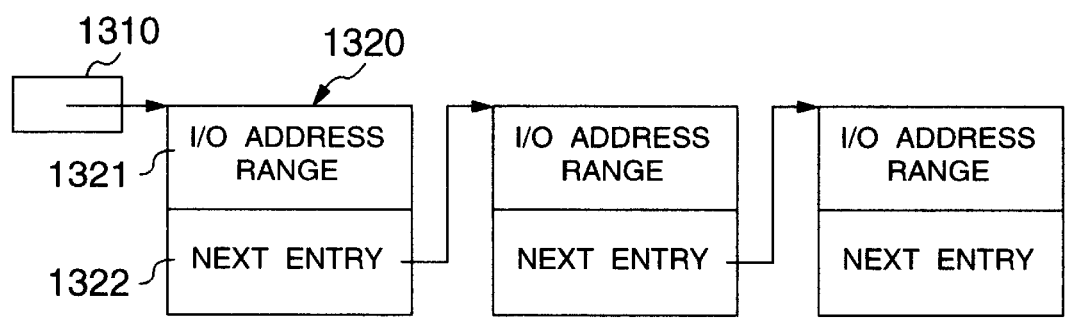
FIGS. 13A and 13B are diagrams showing the data structure of a device management table of the first OS of the embodiment.

The device management table will be described. FIGS. 13A and 13B are diagrams showing an example of the structure of the device management table of the second OS. The device management table has two data structures, an interrupt vector management table 1300 and an I/O address management list 1310.

The interrupt vector management table 1300 stores a value indicating whether the first OS uses each interrupt number to be accepted by the processor 101. When a device driver requests for an interrupt number during the initializing process, the kernel checks this table 1300 as to whether the requested interrupt number is now in use. Only when it is not in use, a privilege of using the requested interrupt number is given to the device driver. If the table shows that the requested interrupt number is already in use, the first OS cannot use the corresponding device.

This will be more specifically described by taking as an example the I/O devices 116 and 117 shown in FIG. 2. It is assumed that the I/O devices 116 and 117 request for the interrupt numbers "4" and "5". The I/O devices 116 and 117 are devices managed by the second OS. The interrupt numbers requested by the I/O devices 116 and 117 are stored in the second OS configuration information entry 704 of the kernel configuration information table 700. By referring to this configuration information 704, at Step 1204 a value representative of in-use is stored in the entries corresponding to the interrupt numbers "4" and "5" of the interrupt vector management table. Since this process is performed before the first OS manages devices, the first OS cannot access the I/O devices 116 and 117 so that the devices 116 and 117 can be made under the management by the second OS.

The above description is also applicable to the I/O address management list 1310. The I/O address management list 1310 is a list of a plurality of entries 1320 each indicating an I/O address range. This entry 1320 includes an I/O address range 1321 used by the first OS and a pointer 1322 to the next entry. Similar to the interrupt vector management table 1300, when a device driver requests for an I/O address range during the initializing process, the kernel checks from the I/O address management list 1310 whether the requested I/O address range is already in use. If not in use, an entry is added to this list 1310 and permits the device driver to use the address.

Similar to the interrupt number, the I/O address range to be requested by a device managed by the second OS is stored in the kernel configuration information table 700. Therefore, by referring to this table, the requested I/O address range can be known and the I/O address can be reserved before the first OS starts managing devices.

As stated earlier, it is possible to configure the space dedicated to the second OS perfectly independent from the first OS. With the process at Step 1204, a user program running on the first OS cannot access the device managed by the second OS, in this example, the I/O devices 116 and 117. It is also possible to inhibit the setup of the device driver which used the interrupt number and I/O address of the devices 116 and 117.

The advantages of the processes at two Steps 1202 and 1204 are that the second OS is introduced into a world which the first OS does not know.

Succeeding Steps 1205 to 1207 are similar to the initializing process of a general OS. In the system device initializing process at Step 1205, the system device directly managed by the kernel is initialized. The system device is a device such as clock interrupt which is essential for the execution of the first OS and is presumed by the first OS that it is necessarily present. In FIG. 12 Step 1204 is executed at a relatively earlier stage of the flow chart. This stage of Step 1204 is not limited if similar advantages are retained. For example, it may be executed after Step 1205 to reserve the device to be managed by the second OS so as not to be conflict with the device reserved by the first OS. An important point is that when the first OS intends to additionally register a device, the interrupt number and I/O address of the device managed by the second OS are made not to be usable by the first OS.

At Step 1206 each object file loaded by the kernel loader is initialized. An initialization entry address is stored in the header field of the object file. Lastly, an initial process is generated (Step 1207).

Figure 14:
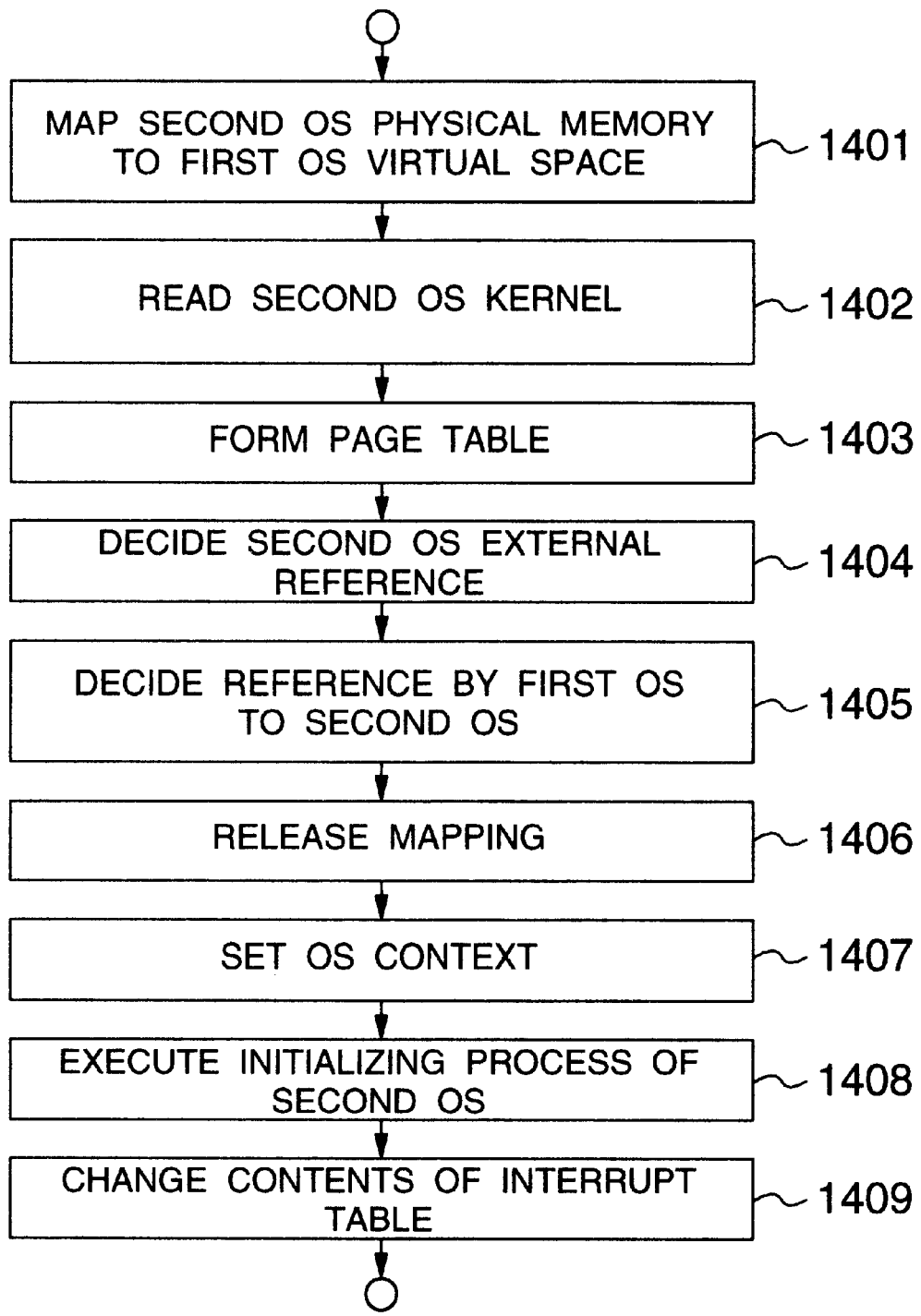
FIG. 14 is a flow chart illustrating a setup process of a second OS of the embodiment.

Next, the load process of the second OS of this embodiment will be described. FIG. 14 is a flow chart illustrating the load process of the second OS. This process starts when a predetermined command is input while the first OS is running.

Referring to FIG. 14, it is necessary first to read the second OS object file into the physical memory area 122 allocated to the second OS. However, the first OS cannot write data in the second OS physical memory area 122 unless any countermeasure is incorporated. In this case, the allocated physical memory area 122 is temporarily mapped to the first OS virtual space 201 (Step 1401).

At Step 1402, the second OS object file is read into the mapped area by using the file read process of the first OS. It is assumed herein that the format of the second OS object file is the same as that of the first object file 800.

Next, the page table 108' of the second OS is formed (Step 1403). This page table is also stored in the second OS also formed in the area for the second OS. In this case, the page table is configured so that a portion shared by the first OS can be accessed from the second OS space 202.

The common area 203 is an area where a device driver (hereinafter called a support driver) for performing an interrupt process and a common data managing process is stored. The address of the common area 203 storing this device driver can be known from the load object list 1104.

At next Step 1404, the external reference of the second OS kernel is decided. In this case, an object file which the second OS can directly refer to is only a function and data in the common area 203, i.e., only the public reference of the support driver. Therefore, by referring to the public reference table 811 stored in the header field of the object file of the support driver, the external address 904 of the external reference table 810 of the second OS kernel object file is determined.

Next, at Step 1405 the address of the second OS public reference is written in the external reference address table allocated in the data area of the common area. Since the support driver as the common area is read as the first OS device driver in accordance with the first OS mechanism, it cannot be linked to the second OS public reference.

In this example, a table is prepared in advance in the data area of the support drive, which table stores an external reference name and corresponding external address. With reference to this table, execution codes of the support drive perform a public function call and a public data reference of the second OS kernel. When the second OS is loaded, an address of the public reference of the support driver is written in an external address entry of this table.

With the above processes, setting the second OS area is terminated, and mapping the second physical memory area to the first OS kernel area is released (Step 1406).

Next a second OS context of an OS context table 1510 and an OS discrimination variable 1530 are set (Step 1407). The second OS context has the data structure which is referenced when the execution OS is switched between the first and second OSs and is constituted of a page table address value and a stack pointer initial value. In this example, an address of the page table mapping the second OS is set as the page table address value, and an initial address of a second OS kernel stack is set as the stack pointer value. Stored in the OS discrimination variable 1530 is a value indicating that the first OS is under execution. The OS context table 1510 and OS discrimination variable 1530 will be later detailed.

Next, a second OS initializing module is executed (Step 1408). For this execution, OS space switching is required which will be later described with reference to another flow chart. The second OS initializing module is public reference and the support driver can know its address.

Lastly, at Step 1409, the addresses of the first OS interrupt handlers stored in the first OS interrupt table currently registered in the interrupt table register 104 are copied to each handler address entry 1522 of the interrupt discrimination table 1520, and the value in the interrupt table register 104 is changed to the address of the interrupt table 107 allocated in the support driver. This is made by the processor 101 which changes the contents of interrupt table register 104.

The reason why the interrupt table in the first OS main memory area is changed to the interrupt table 107 of the support driver is that the interrupt table and interrupt handler are required to be present always in the virtual address space of the processor 101 irrespective of which OS is running when an interrupt is issued from an I/O device. The interrupt handler registered in the interrupt table 107 is also placed in the support driver. Since the support driver area is mapped to the second OS virtual space at Step 1403 as the common area 203, it can always be accessed. The interrupt process of the support drive will be later described.

At Step 1409 also the first OS interrupt management information is changed. Specifically, the data structure regarding the interrupt level is changed, which will be described later.

Figure 15:
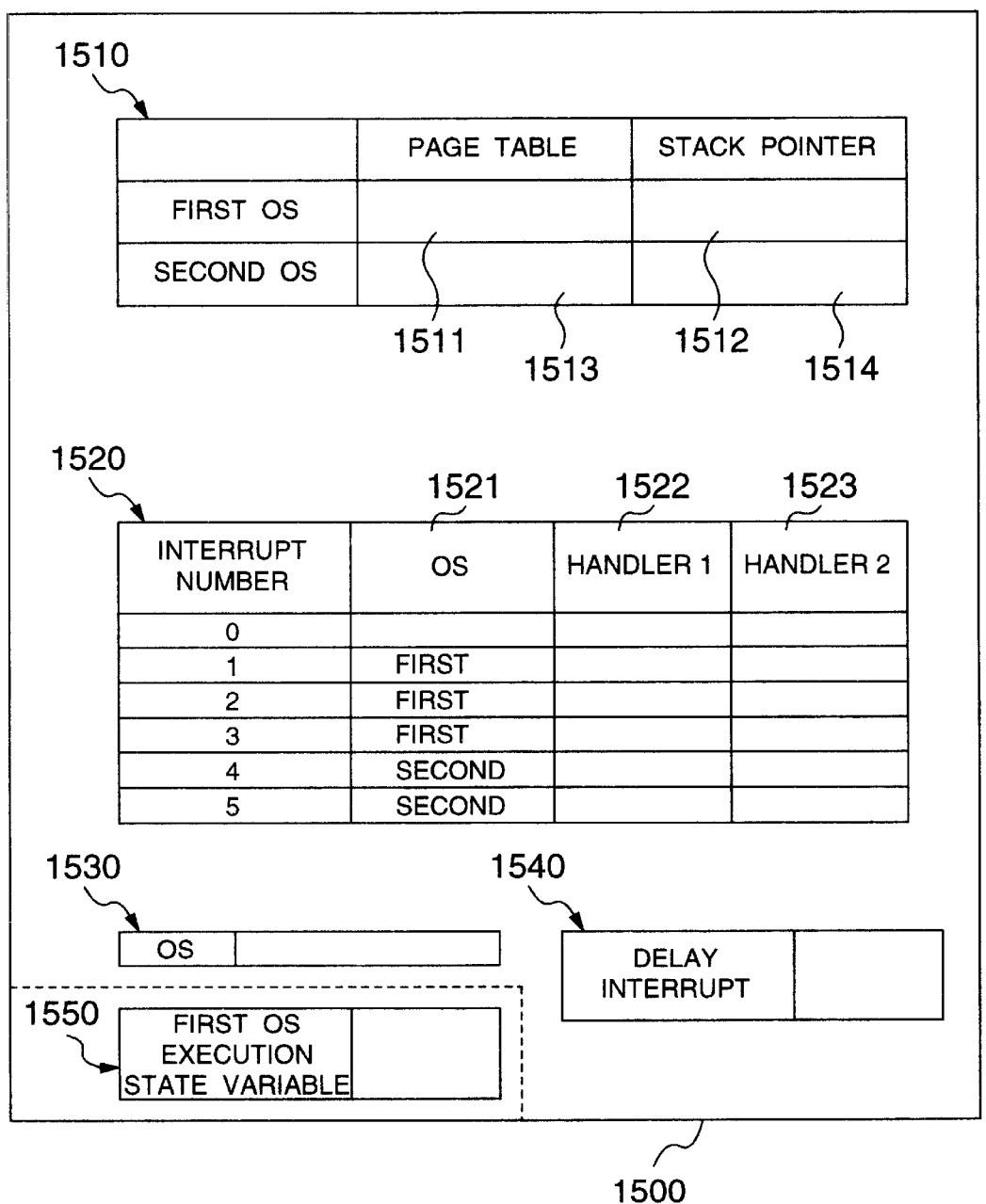
FIG. 15 is a diagram showing the data structure shared by the first and second OSs.

The data structure of data in the common area 203 will be described. FIG. 15 is a diagram showing the data structure of data stored in a data area 1500 in the common area 203. Each part of this data structure will be described in order with reference to FIG. 15.

Reference numeral 1510 represents the OS context table. The OS context table 1510 stores data necessary for switching between the first and second OSs. In this embodiment, it is assumed that the first OS can run only while the second OS is in an idle state. If switching to the second OS is performed at some timing while the first OS is running, and after the second OS terminates its execution, the control is returned to the first OS.

Therefore, it is sufficient if each OS stores a pair of contexts. If the first OS stores a page table register value 1511 and a stack pointer value 1512 at the time when the OS switching is requested, then it is possible to resume the control of the first OS after the execution of the second OS is terminated.

When the control is switched from the first OS to the second OS, the second OS is not running. Therefore, the fixed values of the page table address and stack pointer can be used as the context of the second OS. The page table register value 1513 and stack pointer value 1514 of the second OS are set when the second OS is loaded (Step 1407).

Reference numeral 1520 represents the interrupt discrimination table. The interrupt discrimination table 1520 stores a value 1521 indicating which OS processes an interrupt and an address 1522 of the interrupt handler, for each external interrupt number. When an external interrupt occurs, the interrupt handler 107 in the common area 203 captures this interrupt. The interrupt handler then determines which OS processes this interrupt by referring to the OS entry 1521 of the interrupt discrimination table 1520 to thereafter pass the control to the handler designated by the handler address 1522.

Reference numeral 1530 represents the OS discrimination variable which stores the value representative of the execution OS. This variable 1530 is set each time the OS switching process is executed in the process starting at Step 1601. The interrupt process sequence is determined with reference to this variable 1530.

Reference numeral 1540 represents a delay interrupt state variable indicating whether an interrupt of the device managed by the first OS has occurred. This variable 1540 stores a record of interrupt numbers issued. In the OS switching process, it is determined whether the interrupt process is executed or not, by checking the variable 1540 when the second OS execution is terminated (Step 1608).

Figure 16:
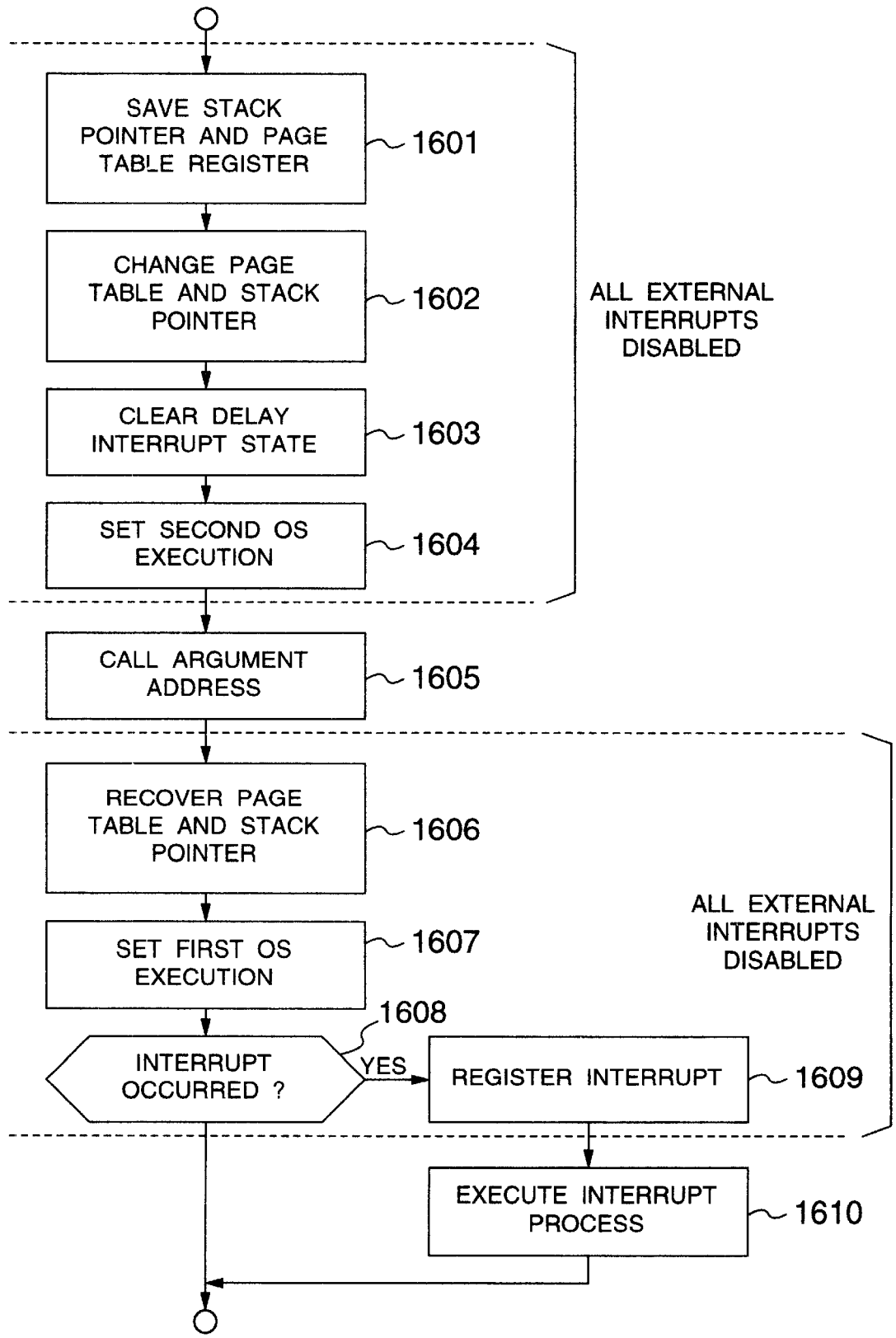
FIG. 16 is a flow chart illustrating a process of changing an execution OS of the embodiment.

The OS switching process will be described. FIG. 16 is a flow chart illustrating the OS switching process. This switching process is called to switch to the second OS while the first OS is executed.

During the process illustrated in FIG. 16, the address of a second OS module to be executed after the operation is switched to the second OS and an argument passed to the module, are received as arguments. It is possible to identify the address of the second OS module by referring to the external reference address table 810 set in the common area 203.

First, at Step 1601 the current stack pointer value and page register value are saved as the first OS context of the OS context table 1510. The current stack pointer value is saved in the entry 1512 and the current value of the page register table 105 is saved in the entry 1511.

Other register contexts are not necessary to be saved in the OS context table 1510. However, if necessary, they are saved in the first OS stack.

After the stack pointer and page register values are saved, at Step 1602 the address of the page table for mapping the second OS to the virtual space is set to the page table register 105. This address is written in the entry 1513 of the OS context table 1510. The stack pointer is also set for the second OS. The stack pointer is written in the stack pointer entry 1514 of the second OS in the table 1500.

At Step 1603 the delay interrupt state variable 1540 indicating the interrupt state of the first OS is cleared. The state variable 1540 is a variable which records the occurrence state of interrupts issued from devices managed by the first OS while the second OS runs. Before the second OS is executed, this variable is cleared.

The OS discrimination variable 1530 indicating an OS under execution is changed to a value indicating the second OS (Step 1604). Since the stack pointer, page table register 105, and OS discrimination variable 1530 are required to have consistent values, it is necessary to perform Steps 1601 to 1604 under the conditions that all external interrupts are disabled.

At Step 1605, the control is passed to the second OS to deal with the address of the module received as the argument. In the embodiment, it is assumed that the first OS can be executed only when the second OS is not executed, i.e., only when the second OS is in the idle state. Therefore, when the execution of the second OS is terminated, the control is passed to Step 1606.

At Step 1606 the page table register value 1511 and stack pointer value 1512 saved in the OS context table 1510 at Step 1601 are recovered. At next Step 1607, the OS discrimination variable 1503 is changed to a value indicating that the first OS is under execution. Two Steps 1606 and 1607 are also necessary to be performed under the conditions that all other interrupts are disabled.

Next, an external interrupt issued from a device managed by the first OS during the execution of the second OS is processed. First, at Step 1608 the delay interrupt state variable 1540 is checked to determine whether any interrupt has occurred. If not, the OS switching process is terminated and the control returns to the caller.

If any interrupt has occurred, Step 1609 is performed whereat the interrupt issued during the execution of the second OS and still not processed is recorded in the delay interrupt state variable managed by the first OS. Next, the interrupt process by the first OS is executed (Step 1610). After all interrupt processes are completed, the control returns to the caller of the OS switching process.

Figure 17:
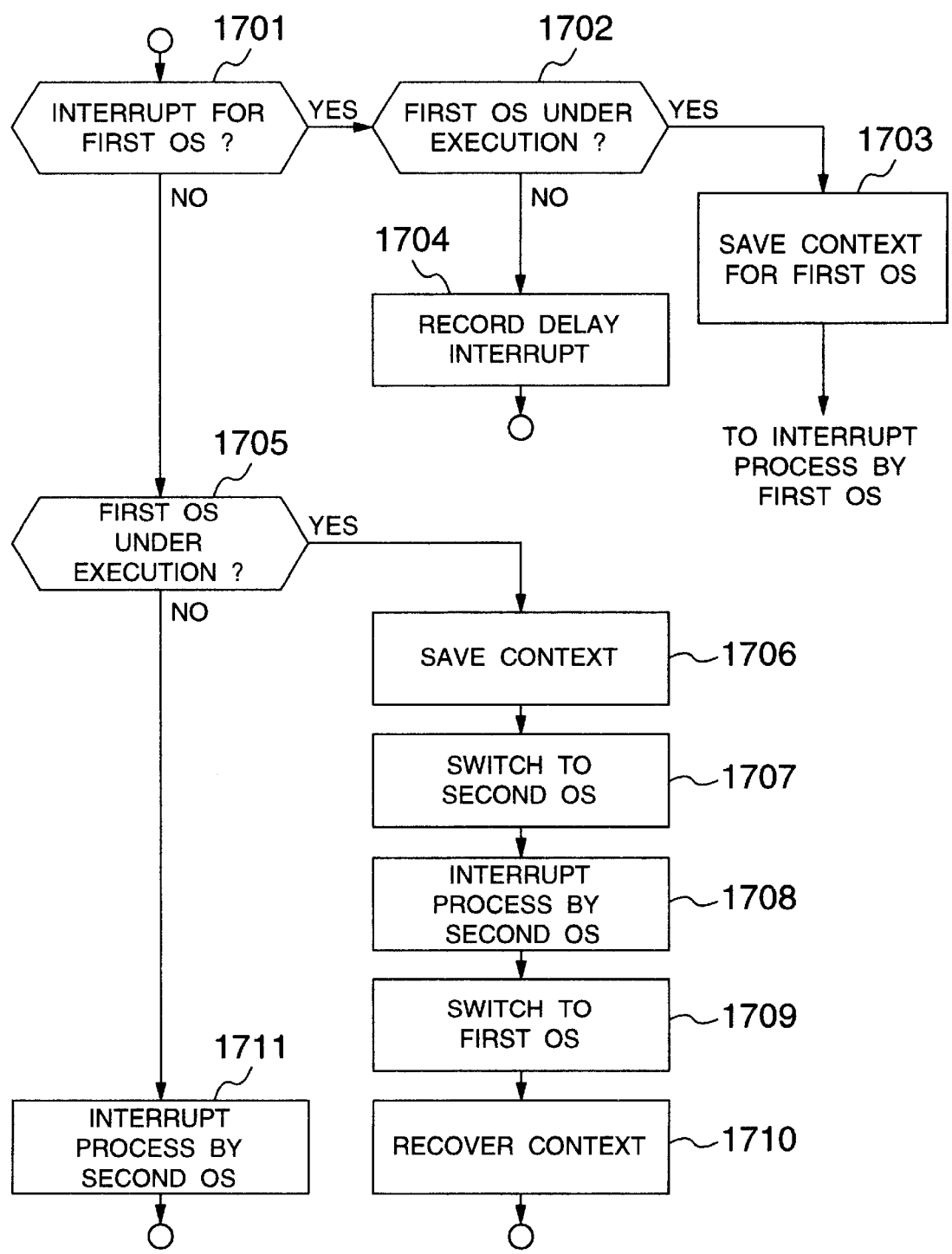
FIG. 17 is a flow chart illustrating an interrupt process of the embodiment.

The interrupt process of the embodiment will be described. FIG. 17 is a flow chart illustrating the interrupt process of the embodiment. A module for executing the interrupt process is registered as an interrupt handler in the interrupt table 107 of the processor 101. This interrupt handler is located in the common area 203 allowing both the OSs access it.

When an external interrupt occurs and the interrupt handler is activated by the processor 101, the interrupt handler checks the interrupt factor to judge whether the device issued the interrupt is the device managed by the first or second OS (Step 1701). This judgement is made by referring to the OS entry 1521 of the interrupt discrimination table 1520 by using the interrupt number as a search index. If the interrupt was issued by the first OS device, the flow advances to Step 1702, whereas if it was issued by the second OS device, the flow advances to Step 1705. In the example shown in FIG. 15, if the interrupt number is "1", it means the interrupt for the first OS, and if the interrupt number is "4", it means the interrupt for the second OS.

If an interrupt is made by the device managed by the first OS, Step 1702 is executed whereat the execution OS at the time of interrupt is judged. This judgement is made by referring to the OS discrimination variable 1530. If the execution OS is the first OS, the flow advances to Step 1703, whereas if it is the second OS, the flow advances to Step 1704.

The process starting from Step 1703 is a process to be executed if a device managed by the first OS issues an interrupt during the execution of the first OS. At Step 1703 the contexts are changed as if the process starting from Step 1701 does not exist and as if the first OS interrupt handler is directly called by the processor 101. The contexts are the contents of the stack and register. The control is passed to the first OS interrupt handler. The address of the first OS interrupt handler is stored in the handler entry 1522 of the interrupt discrimination table 1520. For example, if the interrupt number is "1", the interrupt discrimination table is checked to search the handler address by using "1" as a search index.

In this case, the control is not returned to the process starting from Step 1701, and the first OS continues to process.

If a device managed by the first OS issues an interrupt during the execution of the second OS, Step 1704 is executed. At Step 1704 an interrupt number of the interrupt issuing device is registered in the delay interrupt state variable 1540 to then terminate the process by the interrupt handler. This interrupt process is executed when the execution OS is switched to the first OS (Step 1608).

If a device managed by the second OS issues an interrupt, the flow advances to Step 1705 whereat it is checked which OS is under execution. This check is also made by using the OS discrimination variable 1530. If the first OS is under execution, the flow advances to Step 1706, whereas if the second OS is under execution, the flow advances to Step 1711.

If an interrupt by the device managed by the second OS is issued during the execution of the second OS, Step 1711 is executed whereat the second OS interrupt handler is activated. The address of the second OS interrupt handler is written in the handler entry 1522 of the interrupt discrimination table 1520. When the process by the second OS interrupt handler is completed and the control is returned, this interrupt handler is terminated and the contexts at the time of the interrupt are recovered and the control is returned.

If an external interrupt by the device managed by the second OS is issued during the execution of the first OS, Step 1706 is executed. In this case, the second OS process has a priority over the first OS process.

First, at Step 1706 the first OS contexts are saved. The contexts are the contents of the stack and register necessary for recovering the state at the time of the interrupt when the control is returned to the first OS after the interrupt process. These contexts are saved in the stack of the first OS kernel.

Next, the execution OS switching and activation of the interrupt process by the second OS are executed (Steps 1707, 1708). These operations are executed by the process starting from Step 1601.

When the process by the second OS is completed, switching to the first OS is executed (Step 1709), and the first OS contexts at the time of the interrupt are recovered (Step 1710) to resume the process by the first OS.

The clock interrupt shared by the two OSs will be described. The clock interrupt is captured by an interrupt handler in the common area. With this interrupt handler, first an interrupt handler for the second OS clock interrupt is executed. The second OS interrupt handler is stored in the handler 2 entry 1523. After the execution of the second OS interrupt handler, the first OS interrupt process is executed by the process starting from Step 1702 shown in FIG. 17. The address of the first OS interrupt handler is stored in the handler 1 entry 1522.

Next, a first OS interrupt management will be described. This first OS interrupt management is provided so that the first OS interrupt management does not erroneously mask an interrupt from the device managed by the second OS.

It is assumed that the first OS controls an interrupt by an interrupt level. The interrupt level is a tool for realizing a synchronization between a part operating as an extension of the interrupt process in the OS kernel and a part not operating in such a manner.

The first OS realizes interrupt levels through programming of the interrupt controller 112. Specifically, the interrupt mask register 502 of the interrupt controller 112 is programmed so as to selectively mask the external interrupt. Since the first OS knows the second OS not at all, there is a possibility that an interrupt by the device managed by the second OS is masked when the first OS changes the interrupt inhibition levels. In order to avoid this, the second OS changes the first OS interrupt control.

Figures 18, 19:
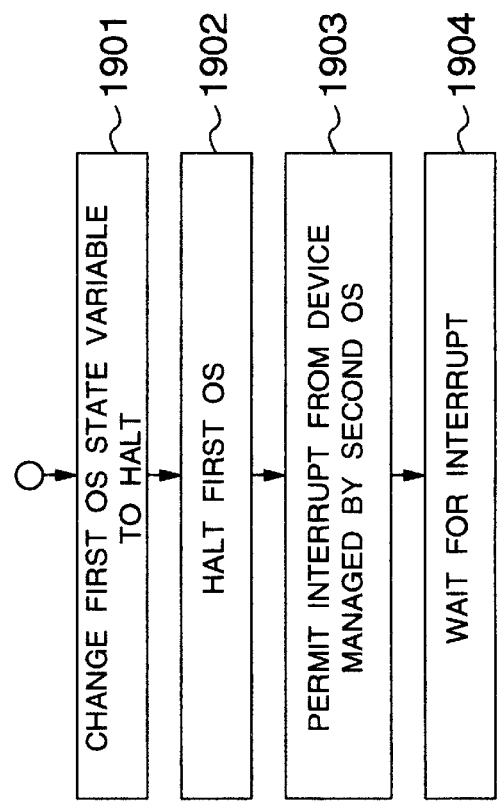
FIG. 18 is a diagram showing the data structure used by an interrupt masking process of the first OS of the embodiment.
FIG. 19 is a flow chart illustrating a failure halt process of the first OS according to another embodiment of the invention.

FIG. 18 shows the structure of data managed by the first OS for realizing the interrupt inhibition levels. Reference numeral 1800 represents an interrupt inhibition table. Each interrupt level is represented by a numerical value and used for masking some interrupts having interrupt numbers specific to the level. A check mark in the table 1800 indicates that the corresponding interrupt is masked. In this example of the interrupt inhibition table 1800, no interrupt is masked at the interrupt level "0". The interrupt level "3" indicates that the interrupt controller 112 masks the interrupts having the interrupt numbers "3" to "5". At the interrupt level "5", all the interrupts are masked by the interrupt controller 112.

In the embodiment of this invention, this interrupt inhibition table 1800 is changed when the second OS is initialized (Step 1409). At Step 1409 the processor 101 changes the interrupt inhibition table in order that the first OS does not mask the interrupts issued by the devices managed by the second OS. Specifically, by referring to the OS entry 1521 of the interrupt discrimination table 1520, the processor 101 clears the check marks of the interrupts managed by the second OS from the interrupt inhibition table 1800.

In this example, the interrupts having the interrupt numbers "4" and "5" are managed by the second OS. Therefore, the entries of the interrupt numbers "4" and "5" (both the entries 1801 and 1802 hatched in FIG. 18) are cleared from the interrupt inhibition table 1800 at all the interrupt levels.

In the above manner, even if the first OS changes the interrupt level, the interrupts by the devices managed by the second OS cannot be masked.

As described so far, two OSs can run on a single computer at the same time. Similarly, three or more OSs can run at the same time.

According to the present invention, two OSs can operate at the same time with a simple system configuration by changing the first OS, because the changed configuration is limited only to the initializing portion, device resource reservation and interrupt control respectively of the first OS kernel.

In a virtual machine system, emulation of a privilege instruction is necessary in order to virtualize the physical memory and I/O channels. If emulation is realized by software, a problem of a large overhead arises. Therefore, a virtual machine system often uses special hardware to reduce the overhead. In the present invention, however, devices managed by each OS are predetermined, and an area of a physical memory usable by each OS is predetermined at the time of initialization. Therefore, without any interference between OSs, a control by complicated software of a virtual machine and hardware for speeding up the system processing speed can be dispensed with.

According to the present invention, it is easy to add an OS which supplements a function of a first OS. Although the conventional techniques can add a new function such as a device driver to the kernel of the first OS as its constituent, this new constituent added to the first OS can operate only under the management of the first OS. Therefore, if the first OS halts by any failure, the added function module cannot operate.

According to the present invention, the constituent realizing the new function can be configured independently from the first OS. Therefore, even if the first OS halts, the added function module can be used continuously. This embodiment will be later described. If a function module requiring high reliability is added as the second OS, it is possible to perform a recovery measure whatever it is, even if the first OS halts. As above, the present invention realizes a high reliability computer system.

In the above embodiment, a process by the second OS is executed with a priority over a process by the first OS. Namely, the first OS can operate only while the second OS is in the idle state, and an interrupt for the second OS can be processed always at once. Therefore, even if the first OS is not suitable for real time processing, the second OS suitable for real time processing can be incorporated so that a computer system excellent in real time processing can be configured while the performance of the first OS is retained. For example, if the first OS has a poor real time processing performance although it has an excellent GUI, an OS having an excellent real time processing performance is used as the second OS operating with a priority over the first OS, so that a computer system excellent in both GUI and real time processing can be realized.

As above, the present invention realizes a method of readily incorporating a function which the first OS lacks, without any support of special hardware, the function being capable of operating quite independently from the first OS.

Next, another embodiment of the invention will be described. This embodiment is an extension of the embodiment described above. With this embodiment, a second OS continuing to operate even a fist OS halts by any failure can be introduced.

A first OS execution state variable 1550 is placed in the common area 203 as shown in FIG. 15, in addition to those elements of the first embodiment shown in FIG. 1. This variable 1550 stores a value indicating whether the first OS is normally operated or not. The variable 1550 is initialized to the value indicating that the first OS operates normally, in the process of loading the second OS.

FIG. 19 is a flow chart illustrating the process of halting the first OS of this embodiment. This halting process is realized by modifying a module of executing the halt process of the first OS.

When the control is passed to the first OS halting process module, the first OS execution state variable 1550 is set to the value indicating the first OS halt (Step 1902). Thereafter, the first OS halt process is executed (Step 1902). Lastly, an interrupt for the first OS is masked and an interrupt by the device managed by the second OS is permitted (Step 1903) to wait for any interrupt (Step 1904). When an interrupt occurs, the OS is switched to the second OS and the process is executed by this OS.

The execution OS switching is also modified. In the embodiment shown in FIG. 1, the execution OS is switched in the process starting from Step 1601. However, in this embodiment, after the module for the second OS is executed, i.e., after Step 1605, the first OS execution state variable 1550 is checked. If the first OS execution state variable 1550 has the value indicating the first OS halt, the processes from Step 1606 are not executed but an interrupt is awaited.

With the above data structure and processes, even if the first OS halts, the second OS can be operated continuously. In this embodiment, the first OS halt process module is modified. Instead, a module to be executed during the error halt process for the first OS may be modified to detect a halt of the first OS, with similar advantages as above being expected.

A further embodiment of the invention will be described. In the two embodiments described above, the core portions of the kernels are modified to run two OSs at the same time. In this embodiment, without modifying the core portion of the kernel, the function similar to the above embodiments is realized.

In some OS which supports various types of hardware resources, hardware dependent processes are separated from the core portion of the kernel and configured as a separate object file. For example, such a case is used for computers having different interrupt controllers 112 and for computers having different I/O address spaces because of different configurations of busses 109.

Figure 20:
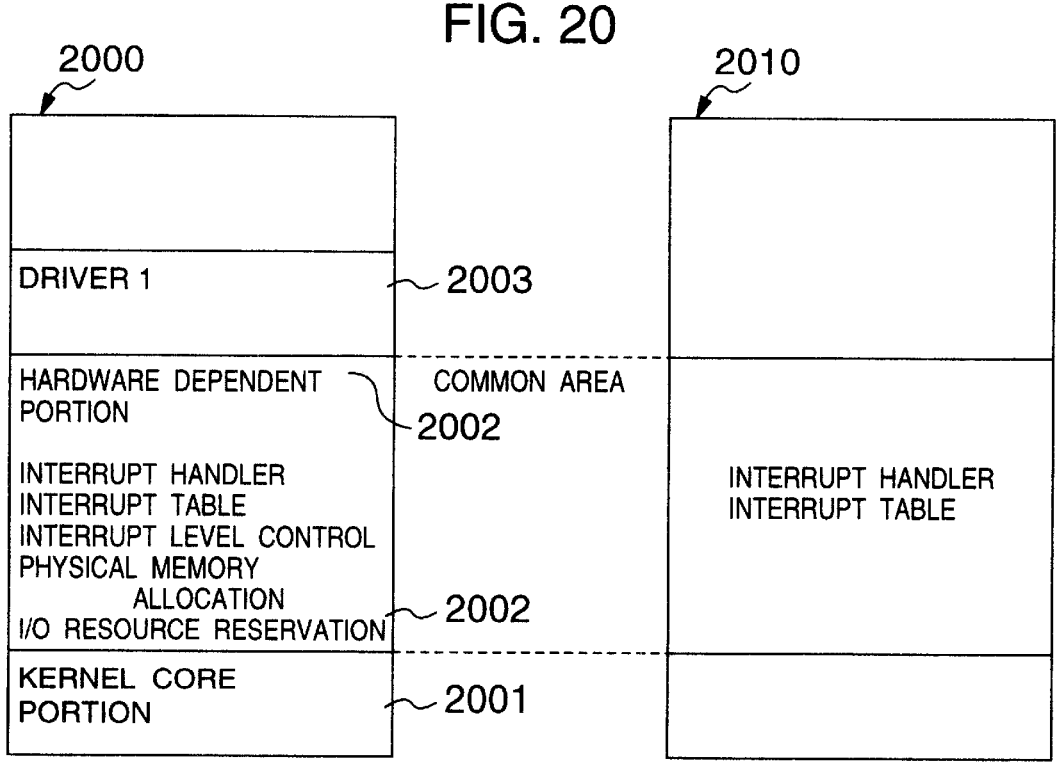
FIG. 20 is a diagram showing the structure of kernel areas of the first and second OSs according to another embodiment of the invention.

FIG. 20 is a diagram showing the kernel area of such an OS, i.e., an OS in which codes and data for absorbing differences between basic hardware resources such as interrupt controllers and busses are separated from the core portion of the kernel and configured as a separate object file.

The kernel area 2000 stores modules to be executed by the processor 101 in the kernel mode and data structures managed by the OS. The kernel core portion 2001 stores codes and data for hardware independent processes such as memory management, process scheduling, and file system. Specifications are defined for between the kernel core portion 2001 and a hardware dependent portion 2100, the specifications being directed to the modules which the hardware dependent portion provides and the modules which the kernel core portion 2100 provides. If the hardware dependent portion 2100 is configured in conformity with these specifications, the OS can run on various types of computers.

The hardware dependent process in conformity with the specifications is separated as an object file 2100 and mapped to an area 2002 independent from the kernel core portion. The kernel core portion 2001 and hardware dependent portion 2100 can call public modules in these portions by the external reference mechanism similar to the embodiment shown in FIG. 1, and function apparently as a single integrated kernel.

In this case, similar advantages as the embodiments described earlier can be obtained by modifying the separated object file 2100 which executes the hardware dependent process, without modifying the object file of the kernel core portion.

More specifically, in executing the separate object file 2100, it is necessary that the physical memory (main memory) can be allocated, that the interrupt level management can be modified, and that the I/O resources can be reserved. Furthermore, the interrupt handler and the interrupt table 107 used for the process starting from Step 1701 are disposed in this object file 2100 and the interrupt table register 104 of the processor 101 is registered in the object file 2100. The separated object file 2100 is set in the common area 203 so that the second OS can also access it. In the above manner, this embodiment can obtain similar advantages as the embodiments described previously.

If the specifications stipulate that the hardware dependent object file 2100 has a module which is executed when the first OS halts, then the fist OS halt can be detected by modifying the module, with the advantages similar to the embodiment shown in FIG. 19 being expected.

In the embodiment shown in FIG. 20, it is not necessary to modify the kernel core portion. It is therefore possible to reduce the area of the first OS to be changed. This embodiment can be reduced in practice easier than the case wherein the kernel core portion is changed.

Also in this embodiment, although the hardware dependent object file is modified, if a device driver can execute similar processes such as memory allocation, I/O reservation and the like, the device driver may configure the embodiment computer system. These processes may be distributed to the kernel loader, hardware dependent file, and device driver to configure the embodiment computer system.

Next, a still further embodiment of the invention will be described. In the embodiments described above, support drivers and object files such as a hardware dependent object file are allocated in the common area 203. Module and data which are essential to be allocated to the common area 203 are only the interrupt table 107, interrupt handlers in the process starting from Step 1701, an OS switching process starting from Step 1601, and the data structure shown in FIG. 15. As in the embodiments, particularly in the embodiment shown in FIG. 19, if the whole of the object file 2100 for the execution of the hardware dependent process is allocated to the common area 203 to allow also the second OS to access it, there is a high possibility that the second OS erroneously accesses the data structure of the first OS.

This embodiment provides a method of allowing the second OS to access only particular sections of the object file 2100 in the common area 203. In this embodiment, a compiler for generating the object file 2100 is required to have on the program a function of designating those sections to which instructions and data are allocated.

A general object file 2100 has a text section containing instructions and a data section containing data. In addition, it has sections for the common area 203 added by the function of the compiler. In this case, the page table 108' is formed so as to allow the second OS to access only a particular address range of the common area sections, the address range being determined by referring to the section data 809 stored in the header field of the object file 2100.

Modifying the object file 2100 containing a module for executing a hardware dependent process will be described by way of example. Of the portions to be modified, the portion relevant to initialization is not necessary to be accessed by the second OS, such as physical memory allocation, I/O resource reservation, and interrupt level management. Only those portions essential also for the second OS to access: such as the interrupt table 107; interrupt handlers used in the process starting from Step 1701; OS switching process starting from Step 1601; and the data structure shown in FIG. 15, are allocated as the common area sections. The program is written in order to realize such allocation and the common area sections are generated by the function of a compiler.

Figure 21:
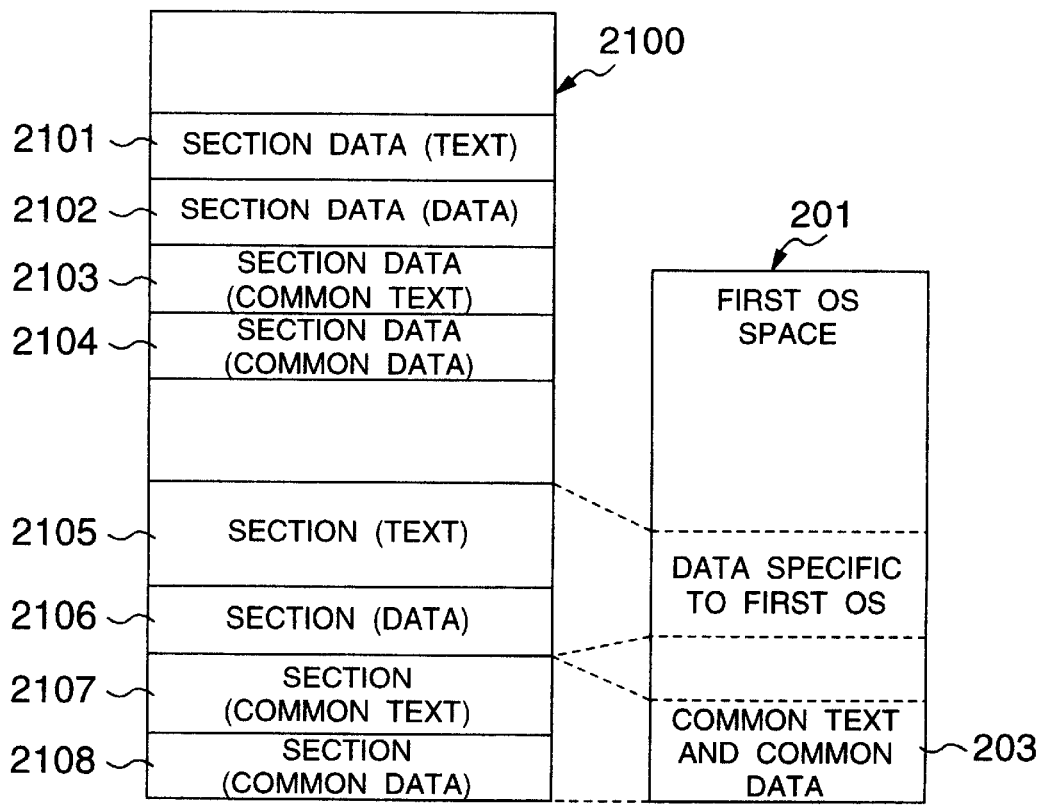
FIG. 21 is a diagram showing the structure of an object file according to a modification of the embodiment shown in FIG. 20.

FIG. 21 shows the structure of a generated object file and the allocation thereof to the first OS space. Reference numeral 2100 represents the generated object file. The header field 2101 to 2104 of the object file 2100 describes the section data contained in the object file 2100. In the header field, section data 2103 and 2104 indicate sections 2107 and 2108 newly generated for the common area 203. In accordance with the contents of the section data 2103 and 2104, the addresses of the sections 2107 and 2108 are obtained, and only these areas are mapped to the kernel of the second OS. The second OS page table 108' is configured to realize such mapping so that the other portions of the hardware dependent object file 2100 can be shielded from the second OS.

Reference numeral 201 in FIG. 21 represents the first OS address space, and reference numeral 203 represents the common area. The common sections 2107 and 2108 contained in the file 2100 are mapped to the common area 203, and the other sections 2105 and 2106 are mapped to the area other than the common area 203. In this manner, the data specific to the first OS and other data can be made not accessible by the second OS.

This embodiment can enhance independence between OSs more than the embodiments described previously, and can configure a safe computer system with less interference between OSs.

Next, a further embodiment of the invention will be described. In this embodiment, a second OS can be introduced into a multi-processor computer system.

Figure 22:
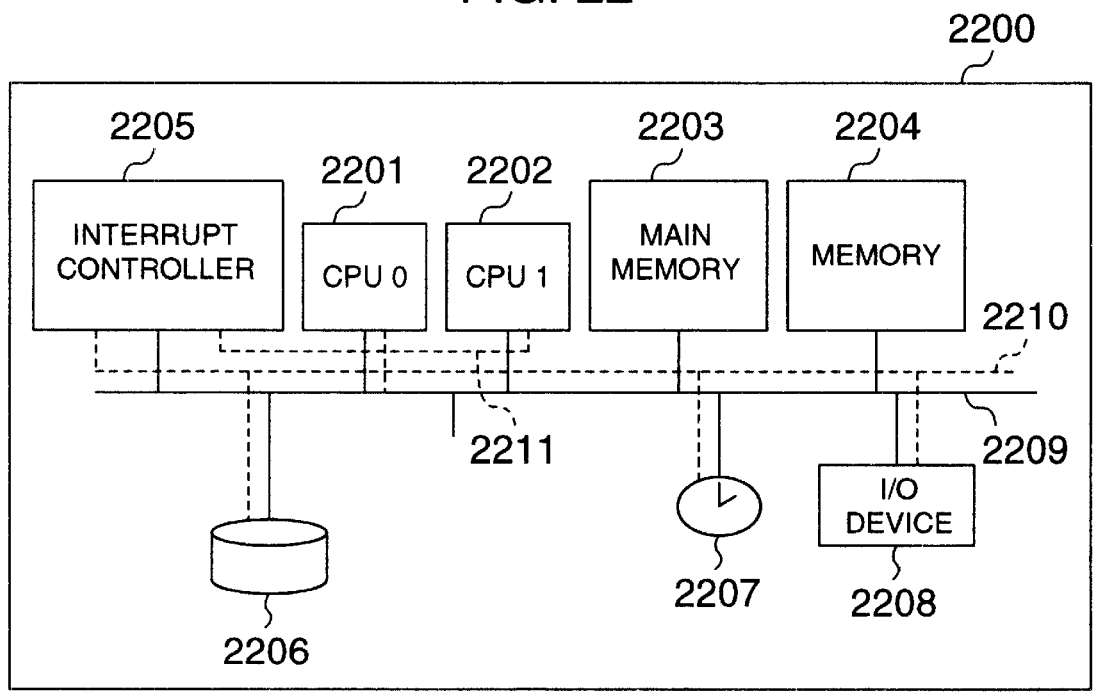
FIG. 22 is a diagram showing the configuration of a computer system according to another embodiment of the invention.

FIG. 22 is a diagram showing a computer system of this embodiment. Reference numeral 2200 represents a computer which has two processors 2201 and 2202 and a main memory 2203. Similar to the embodiment shown in FIG. 1, the computer 2200 has also a memory 2204 storing a computer setup program.

It is assumed that each of the processors 2201 and 2202 has different physical addresses to which the control is passed when the processor is set up and when the processor receives an interrupt for initialization.

An initialization interrupt process program stored in the memory 2204 passes the control to the physical address represented by a value stored in a predetermined physical address.

Connected to a bus 2209 are devices such as a magnetic disk drive 2206, a clock interrupt generator 2207 and an I/O device 2208. The devices which issue an interrupt are connected to an interrupt controller 2205 which is in turn connected via an interrupt bus 2211 to the processors 2201 and 2202. Each processor is assumed that it can transmit an interrupt to the other processor.

The interrupt controller 2205 will be described. The interrupt controller 2205 has a function supporting a multi-processor configuration. In addition to the interrupt mask function of the interrupt controller 112 of the embodiment shown in FIG. 1, the interrupt controller 2205 has a function of notifying an interrupt from each device to which processor or processor group.

Figure 23:
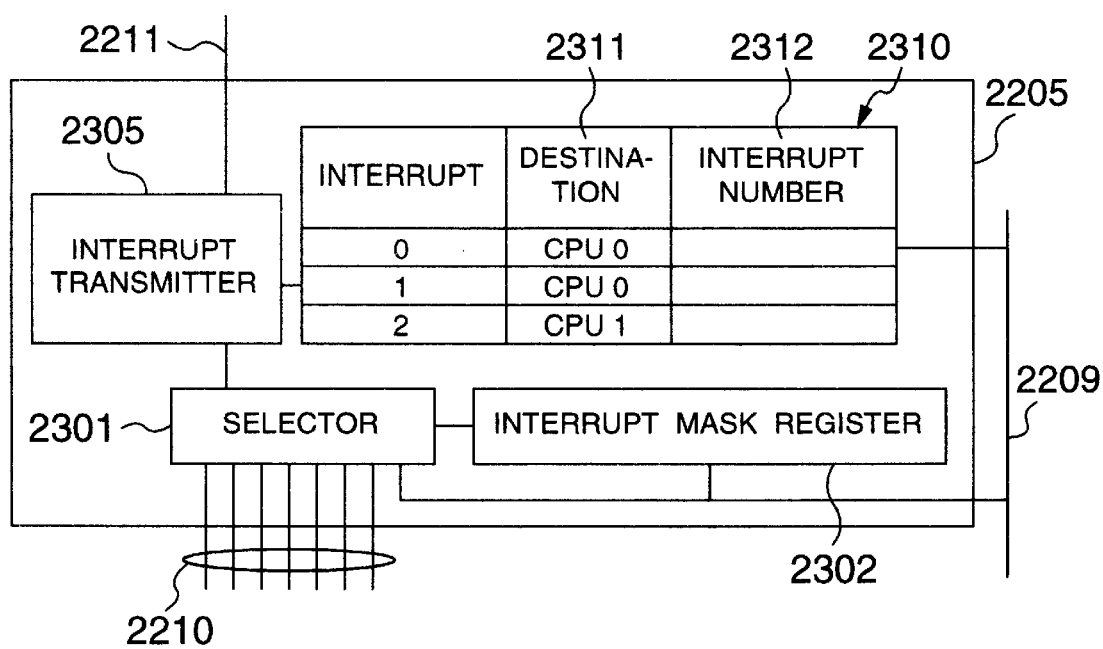
FIG. 23 is a diagram showing the structure of an interrupt controller of the embodiment shown in FIG. 22.

FIG. 23 is a diagram showing the structure of the interrupt controller 2205. The functions of a selector 2302 and an interrupt mask register 2302 are the same as those of the embodiment shown in FIG. 1. In addition to these functions, the interrupt controller 2205 has an interrupt delivery table 2310 and an interrupt transmitter 2305.

The interrupt delivery table 2310 stores a value 2311 and an interrupt number 2312. The value 2311 indicates that to which processor or processor group an interrupt from each device connected to the interrupt controller 2205 is notified. When this notice is sent, the interrupt number 2312 is also sent. The interrupt delivery table 2302 can be set as desired by using an I/O instruction.

In the example shown in FIG. 23, the interrupts "0" and "1" are set so that they are sent to CPU 0 and the interrupt "2" is set so that it is sent to CPU 1.

Upon reception of a signal from the selector 2301, the interrupt transmitter 2305 determines an interrupt destination and the interrupt number by referring to the interrupt delivery table 2310, and transmits signals representative of the notice destination and the interrupt number to an interrupt bus 2211.

The computer 2200 is configured so that only the processor 2201 is activated when the computer 2200 starts operating. The processor 2201 executes the program stored in the memory 2204. Similar to the embodiment shown in FIG. 1, the setup program is executed by reading a kernel loader stored in the magnetic disc 2206 into the main memory 2203. The kernel loader generates the parameter table 1100. In this embodiment, data indicating how many processors does the computer 2200 have, is added to the device list.

After the first OS is loaded, the first OS is initialized. During this initialization, an address of an initialization routine for processors other than non-booted processor are stored at predetermined physical addresses, and an initialization interrupt is sent to the processor 2202. Upon reception of the initialization interrupt, the processor 2202 executes a program stored in the memory 2204 and the control is passed to a non-booted processor initialization routine which in turn sets a page register and an interrupt table register to transfer to a virtual address mode and continue the initialization process.

In the embodiment shown in FIG. 22, when devices for the second OS are reserved at Step 1204 shown in FIG. 12, some processor is also reserved as a processor dedicated to the second OS. It is assumed herein that the processor 2202 is reserved for the second OS.

With the multi-processor configuration, in the system device initialization in the first OS initializing process starting from Step 1201, the initialization interrupt is sent to the non-booted processor. In this case, the processor 2201 sends the initialization interrupt to the processor 2202. In this embodiment, it is assumed that the initialization interrupt is not sent to the reserved processor. Therefore, even if the kernel is initialized, the processor 2202 is not still activated.

When the system device is initialized at Step 1205, the interrupt controller 2205 is also initialized. In initializing the interrupt controller 2205, by referring to the second OS configuration data 704 in the kernel configuration information file 700, the interrupt delivery table 2310 is set so as to make an interrupt by the device managed by the second OS be sent to the processor 2202.

In the second OS initializing process starting from Step 1401 shown in FIG. 14, the initialization routine is set at the address of the second OS initialization routine, and at Step 1407 an initialization interrupt is sent to the processor 2202. In this manner, the second OS can run on the processor 2202.

Different from the embodiments described previously, an interrupt by the device managed by the second OS is sent by the interrupt controller 2205 to the processor 2202 on which the second OS runs. Therefore, it is not necessary to switch the execution OS. The first OS operates under the processor 2201, whereas the second OS operates under the processor 2202. It is therefore unnecessary to perform the interrupt process starting from Step 1701.

The second OS sets a specific interrupt table to the interrupt table register of the processor 2202 and can have a specific interrupt handler. It is not necessary to change the first OS interrupt table. However, when the first OS modifies the interrupt mask register 2302 of the interrupt controller 2205, some modification is necessary so as not to mask an interrupt by the device managed by the second OS.

What is claimed is:

1. A multi-operating-system (multi-OS) configuration method comprising the steps of:

assigning a first hardware resource to a first OS and a second hardware resource to a second OS fixedly and exclusively when said first OS is set up, wherein said first and second OSs are executed independently of each other by a single processor;

storing an interrupt process program in a common area of a physical memory used by said first and second OSs, said interrupt process program accepting interrupts from said single processor, wherein said interrupt process program executes independently of operation of said first and second OSs;

said interrupt process program indicating an execution of an interrupt to one of said first and second OSs based on interrupts accepted; and running one of said first and second OSs independently of the other of said first and second OSs without emulation and software for a privilege instruction to be executed by each of said first and second OSs.

2. A multi-OS configuration method according to claim 1, further comprising the steps of:

loading the second OS in a memory area of said assigned hardware resource;

activating the second OS in a virtual address space different from a virtual address space of the first OS;

setting a part of the physical memory for the first OS as to the common area; and modifying a data structure of the first OS in order not to allow the first OS to disable an external interrupt to be received by the second OS.

3. A multi-OS configuration method according to claim 1, further comprising the steps of:

capturing an interrupt by the interrupt process program;

determining one of the plurality of OSs which executes a process according to the captured interrupt in accordance with an interrupt factor;

calling a module of the one of the plurality of OSs by the interrupt process program; and completing the process by the one of the plurality of OSs.

4. A multi-OS configuration method according to claim 1, further comprising the steps of:

notifying a halt of the first OS caused by an unrecoverable fault to the second OS;

permitting an interrupt by said second hardware resource managed by the second OS at the halt of the first OS; and judging when a process by the second OS is completed whether the first OS is in a halt, and if in a halt, waiting for an interrupt, to thereby continue an operation of the second OS even if the first OS halts.

5. A multi-OS configuration method according to claim 3, further comprising the steps of:

notifying a halt of the first OS caused by an unrecoverable fault to the second OS;

permitting an interrupt by said second hardware resource managed by the second OS at the halt of the first OS; and judging when a process by the second OS is completed whether the first OS is in a halt, and if in a halt, waiting for an interrupt, to thereby continue an operation of the second OS even if the first OS halts.

6. A multi-OS configuration method according to claim 1, further comprising the step of:

preparing a kernel object file of the first OS in a dedicated area of the physical memory, the kernel object file scoring instructions and data shared by the first OS and the second OS, searching the dedicated area of the kernel object file of the first OS when the second OS is set up, and storing only the searched dedicated area in the common area.

7. A multi-OS configuration method according to claim 5, further comprising the step of:

preparing a kernel object file of the first OS in a dedicated area of the physical memory, the kernel object file storing instructions and data shared by the first OS and the second OS, searching the dedicated area of the kernel object file of the first OS when the second OS is set up, and storing only the searched dedicated area in the common area.

8. A multi-OS configuration method according to claim 1, further comprising the steps of:

recording an interrupt by a device managed by the first OS, the interrupt being issued while the second OS is executed;

starting a process of the interrupt issued while the second OS is executed, when a process by the second OS is completed and a control is passed to the first OS; and starting a process of an interrupt by a device managed by the second OS by immediately switching an OS even if the first OS is under execution, to thereby schedule to operate the first OS only during an idle state of the second OS and to shorten a response time to an interrupt issued by the device managed by the second OS.

9. A multi-OS configuration method according to claim 7, further comprising the seeps of:

recording an interrupt by a device managed by the first OS, the interrupt being issued while the second OS is executed;

starting a process of the interrupt issued while the second OS is executed, when a process by the second OS is completed and a control is passed to the first OS; and starting a process of an interrupt by a device managed by the second OS by immediately switching an OS even if the first OS is under execution, to thereby schedule to operate the first OS only during an idle state of the second OS and to shorten a response time to an interrupt issued by the device managed by the second OS.

10. A multi OS configuration method according to claim 1, wherein said assigned hardware resource is used by said second OS only.

11. The method according to claim 1, wherein said first and second OSs control hardware resources assigned thereto independently of each other.

12. The method according to claim 1, further comprising the following steps executed by invoking said interrupt process program:

upon an occurrence of an interrupt, determining an OS to execute a process of said interrupt, based on a factor of said interrupt;

calling a module of said OS thus determined; and upon completion of the process of said interrupt by said OS thus determined, restoring an OS which was executing upon the occurrence of said interrupt.

13. The method according to claim 12, wherein said module of said OS thus determined is an interrupt processing module.

14. The method according to claim 1, further comprising the following steps executed by invoking said interrupt process program:

when said first OS has stopped due to an occurrence of a failure, notifying said second OS of the occurrence of said failure;

allowing an interrupt to a hardware resource assigned to said second OS while said first OS stops;

upon completion of a process of said interrupt by said second OS, determining whether or not said first OS remains stopped; and when it is determined that said first OS remains stopped, keeping an interrupt to said first OS waiting.

15. The method according to claim 14, wherein said hardware resource assigned to said second OS is an input/output device.

16. The method according to claim 12, wherein said module is stored in said common area, and said interrupt process program calls said module of an OS other than an OS which is executing.

17. The method according to claim 12, wherein said module is stored in said common area and, when one of said first and second OSs has stopped due to an occurrence of a failure, said interrupt process program notifies the other of said first and second OSs of the occurrence of said failure in said one OS, and inhibits calling of a module of said one OS.

18. The method according to claim 1, wherein said running step further comprises the following steps:

starting said first OS by using a first area of said physical memory other than said common area and a second area of said physical memory to be used by said second OS such that said first OS does not control said second area;

mapping said second area to a virtual space controlled by said first OS;

loading said second OS in said first area by using a module for reading said first OS; and releasing mapping of said second area to said virtual space.

19. The method according to claim 18, wherein said physical memory is included in a main memory of a single computer.

20. The method according to claim 1, wherein said running step includes a substep of issuing from each OS a privileged instruction to said processor directly.

21. The method according to claim 1, wherein said assigning step includes a substep of assigning hardware resources virtually, and a substep of assigning hardware resources physically.

22. The method according to claim 1, wherein one of said first and second OSs exceeds the other of said first and second OSs in real-time processing performance.

23. The method according to claim 1, wherein one of said first and second OSs executes a recovery processing of a failure of the other.

* * * * *